(12) United States Patent
Kim et al.

(10) Patent No.: US 9,826,078 B2
(45) Date of Patent: Nov. 21, 2017

(54) MOBILE TERMINAL AND CONTROLLING METHOD THEREOF

(71) Applicant: LG ELECTRONICS INC., Seoul (KR)

(72) Inventors: Daebum Kim, Seoul (KR); Myunghee Hwang, Seoul (KR); Jonghyuk Eun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/873,828

(22) Filed: Oct. 2, 2015

(65) Prior Publication Data

US 2016/0119464 A1    Apr. 28, 2016

(30) Foreign Application Priority Data

Oct. 24, 2014  (KR) .......................... 10-2014-0145035

(51) Int. Cl.
*H04M 1/725*      (2006.01)
*G06F 3/0482*    (2013.01)
(Continued)

(52) U.S. Cl.
CPC ...... *H04M 1/72527* (2013.01); *G06F 3/0482* (2013.01); *G06F 3/0486* (2013.01);
(Continued)

(58) Field of Classification Search
CPC ......... H04M 2250/02; H04M 2250/10; H04M 2250/16; H04M 2250/22; H04M 2250/64; H04M 1/72527; H04M 1/7253; H04M 1/72533; G06F 3/0482; G06F 3/0484; G06F 3/0486; G06F 3/0488
(Continued)

(56) References Cited

U.S. PATENT DOCUMENTS 8,332,144 B2 * 12/2012 Diaz ..................... G01C 21/36
701/400
8,498,451 B1 * 7/2013 Agopian .......... H04M 1/27455
382/118
(Continued)

FOREIGN PATENT DOCUMENTS

EP        2 242 240 A1    10/2010
WO     WO 03/027830 A1     4/2003
WO     WO 2013/126289 A1   8/2013

OTHER PUBLICATIONS

European Search Report dated Mar. 2, 2016 issued in Application No. 15188865.8.

*Primary Examiner* — Duc M Nguyen
(74) *Attorney, Agent, or Firm* — Ked & Associates, LLP

(57) ABSTRACT

A mobile terminal and controlling method thereof are disclosed, by which a region desired to be shared with a watch type terminal can be guided. The present invention includes a touchscreen configured to output information, a wireless communication unit configured to communicate with a watch type terminal having a display, and a controller configured to control a display of an object on the touchscreen, in response to receiving a touch input at the touchscreen, transmitting, to the watch type terminal, control information, outputted at the displayed object or a request for the watch type terminal to transmit data corresponding to the information.

18 Claims, 34 Drawing Sheets

(a)

(b)

(51) Int. Cl.
    *G06F 3/0486* (2013.01)
    *G06F 3/0488* (2013.01)
    *H04L 29/06* (2006.01)
    *H04N 5/232* (2006.01)
    *H04W 92/18* (2009.01)

(52) U.S. Cl.
    CPC ........ *G06F 3/0488* (2013.01); *H04L 65/4069* (2013.01); *H04M 1/7253* (2013.01); *H04N 5/23293* (2013.01); *H04M 1/72533* (2013.01); *H04M 2250/22* (2013.01); *H04M 2250/64* (2013.01); *H04W 92/18* (2013.01)

(58) Field of Classification Search
    USPC ...................... 455/41.1, 41.2, 41.3
    See application file for complete search history.

(56) References Cited

U.S. PATENT DOCUMENTS

| | | | |
|---|---|---|---|
| 8,666,654 B2* | 3/2014 | Vandivier | G01C 21/3682 701/411 |
| 2006/0026302 A1* | 2/2006 | Bennett | H04L 29/06027 709/246 |
| 2007/0124503 A1* | 5/2007 | Ramos | G06F 3/017 709/248 |
| 2007/0203646 A1* | 8/2007 | Diaz | G01C 21/3688 701/469 |
| 2009/0104940 A1* | 4/2009 | Seshadri | H04M 1/05 455/563 |
| 2010/0115458 A1* | 5/2010 | Marano | G06F 3/0485 715/784 |
| 2010/0220250 A1* | 9/2010 | Vanderwall | G01C 11/02 348/837 |
| 2010/0262673 A1* | 10/2010 | Chang | G06F 3/1454 709/217 |
| 2011/0163944 A1* | 7/2011 | Bilbrey | G01D 21/02 345/156 |
| 2012/0131519 A1* | 5/2012 | Jitkoff | G06F 3/0481 715/863 |
| 2013/0090065 A1* | 4/2013 | Fisunenko | G06F 3/017 455/41.2 |
| 2013/0141471 A1 | 6/2013 | Batson et al. | |
| 2014/0059169 A1* | 2/2014 | Ko | H04W 8/24 709/217 |
| 2014/0065960 A1* | 3/2014 | Gang | H04B 5/0031 455/41.1 |
| 2014/0113550 A1* | 4/2014 | Li | H04L 67/06 455/41.1 |
| 2014/0154987 A1* | 6/2014 | Lee | H04M 1/7253 455/41.2 |
| 2014/0160143 A1* | 6/2014 | Ballestad | G09G 5/02 345/589 |
| 2014/0223490 A1 | 8/2014 | Pan et al. | |
| 2014/0298353 A1* | 10/2014 | Hsu | G06F 9/54 719/313 |
| 2015/0004905 A1* | 1/2015 | Mizuno | H04B 5/0031 455/41.1 |
| 2015/0079900 A1* | 3/2015 | Rosener | H04W 4/008 455/41.1 |
| 2015/0199167 A1* | 7/2015 | Sugiyama | G06F 3/1454 345/2.3 |
| 2016/0085266 A1* | 3/2016 | Lee | H04N 5/2628 348/240.2 |
| 2016/0119548 A1* | 4/2016 | Geurts | H01Q 1/125 348/207.1 |

\* cited by examiner (a)  (b)

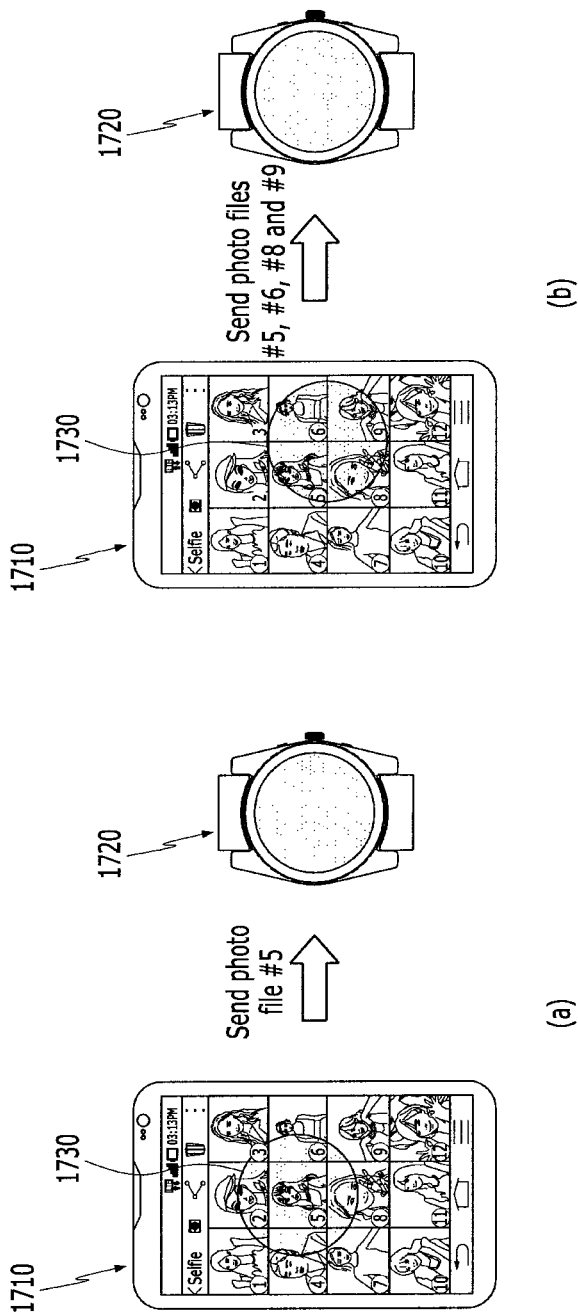

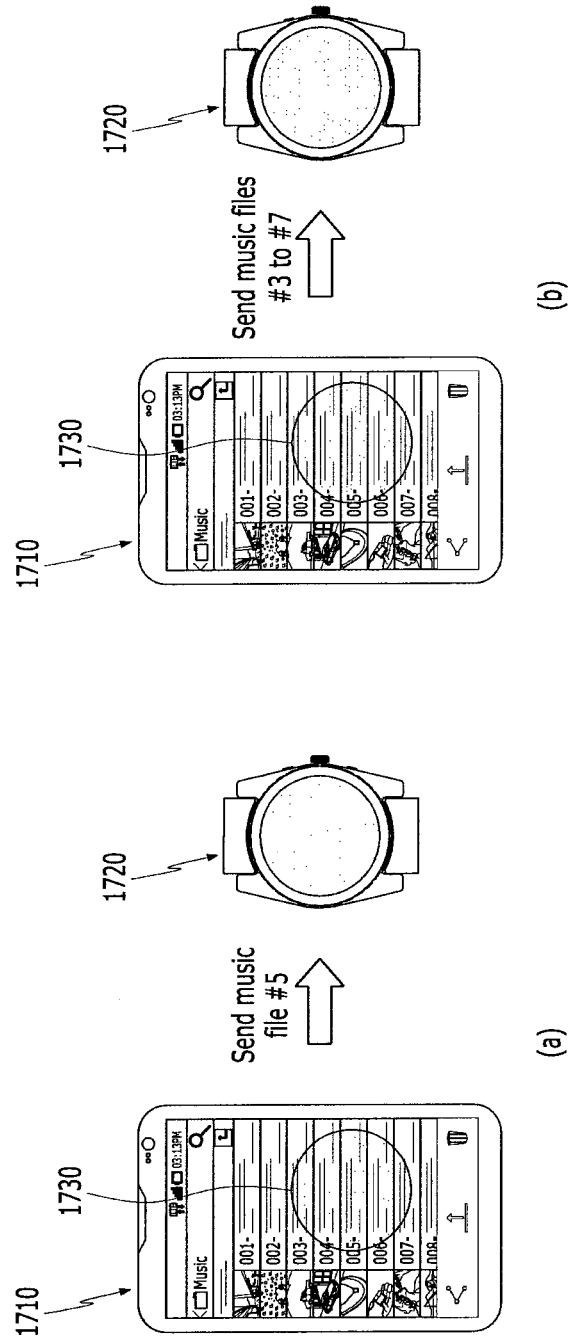

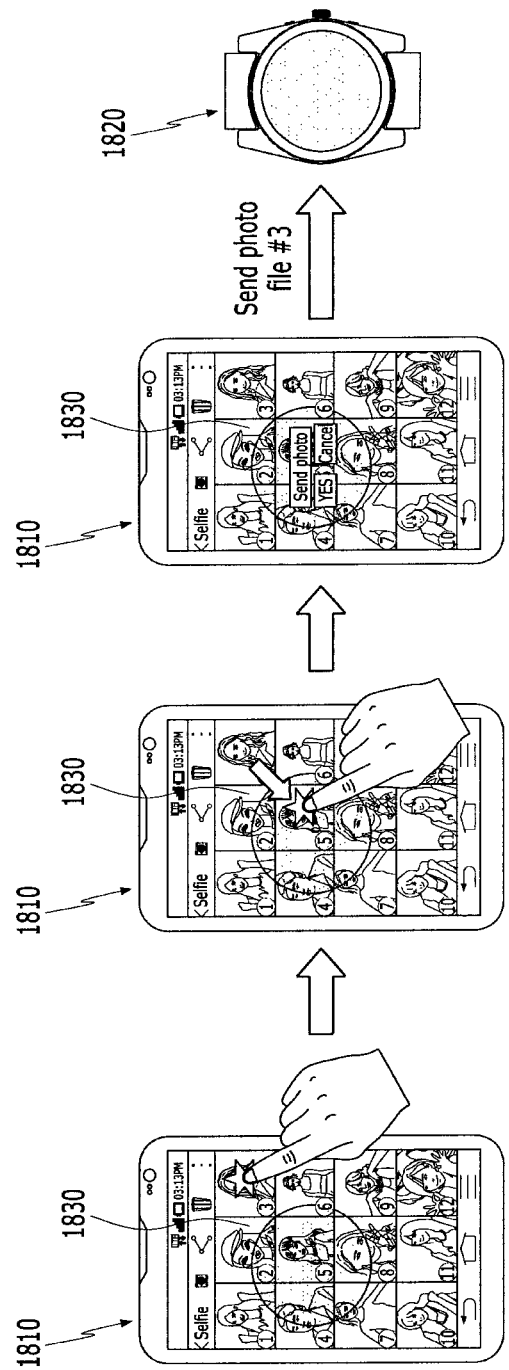

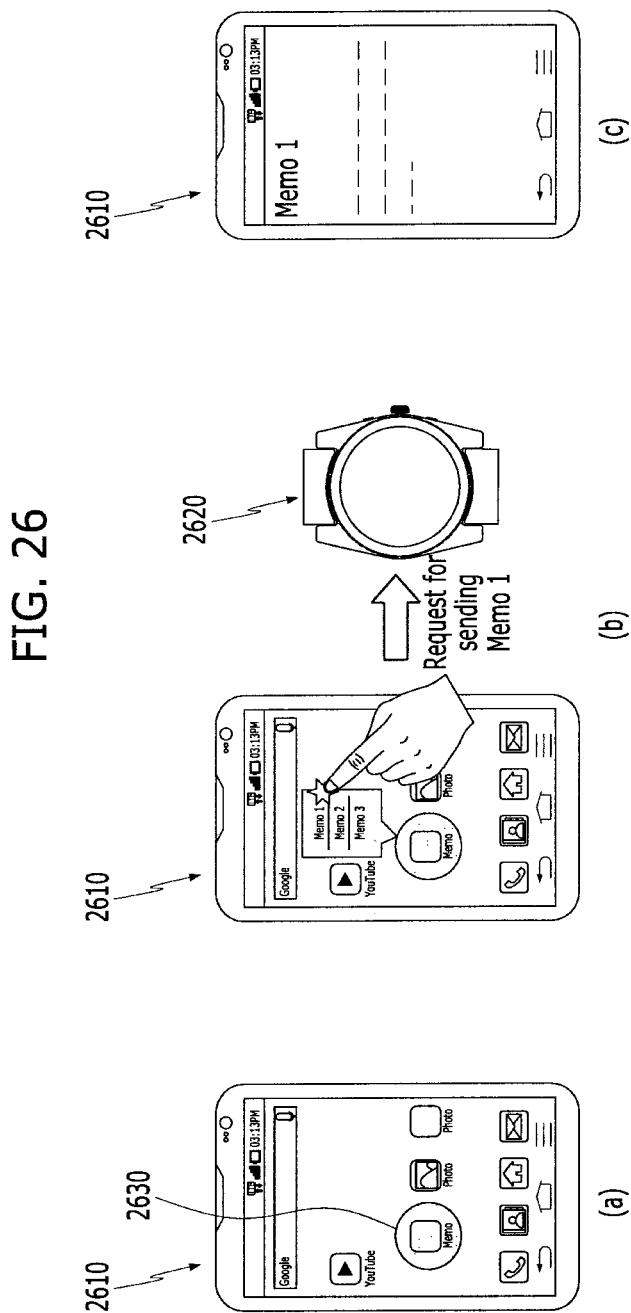

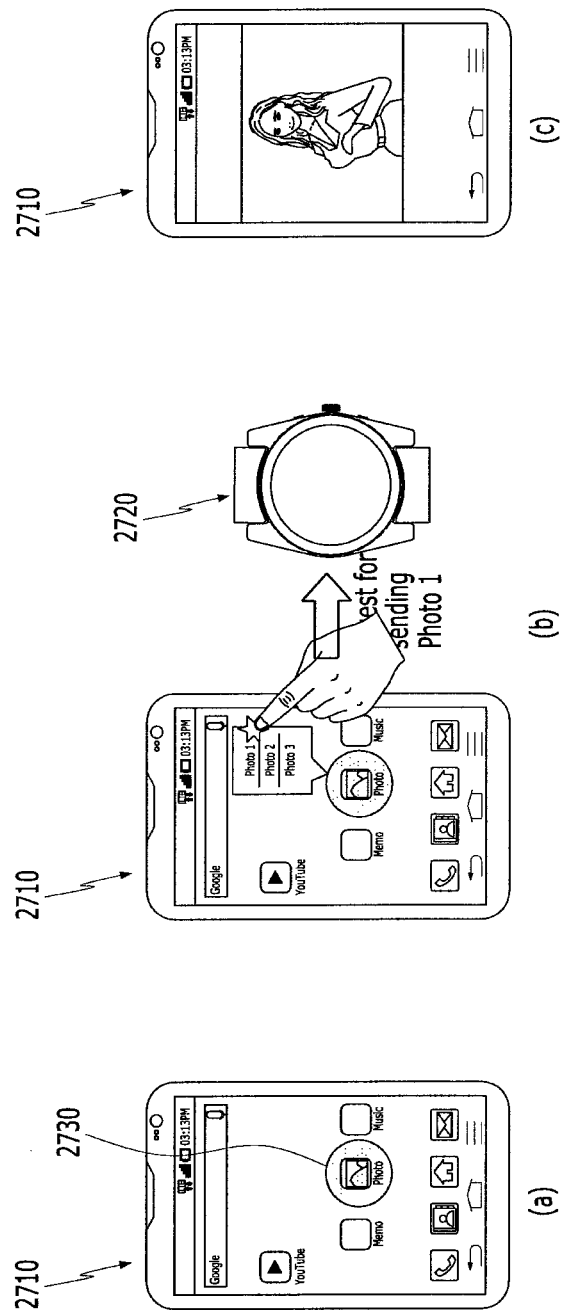

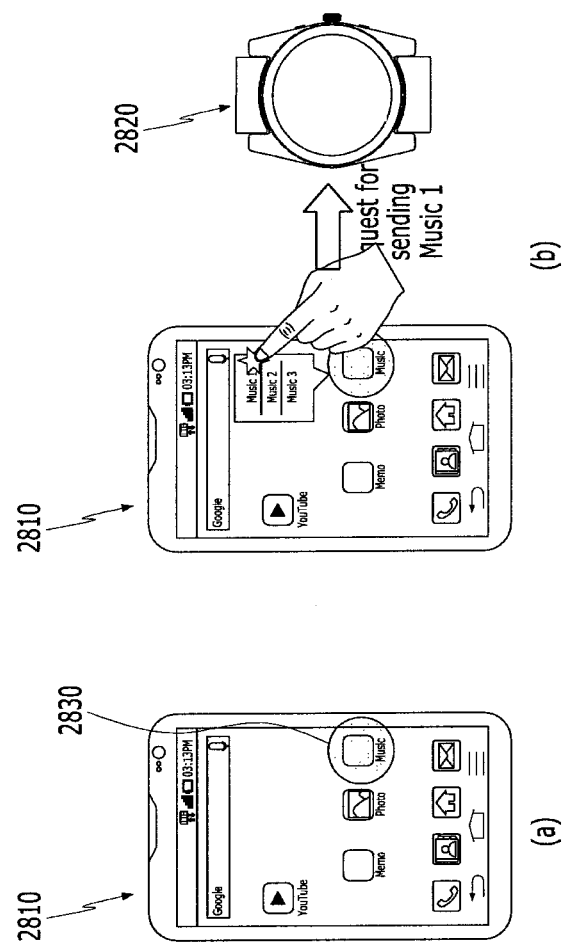

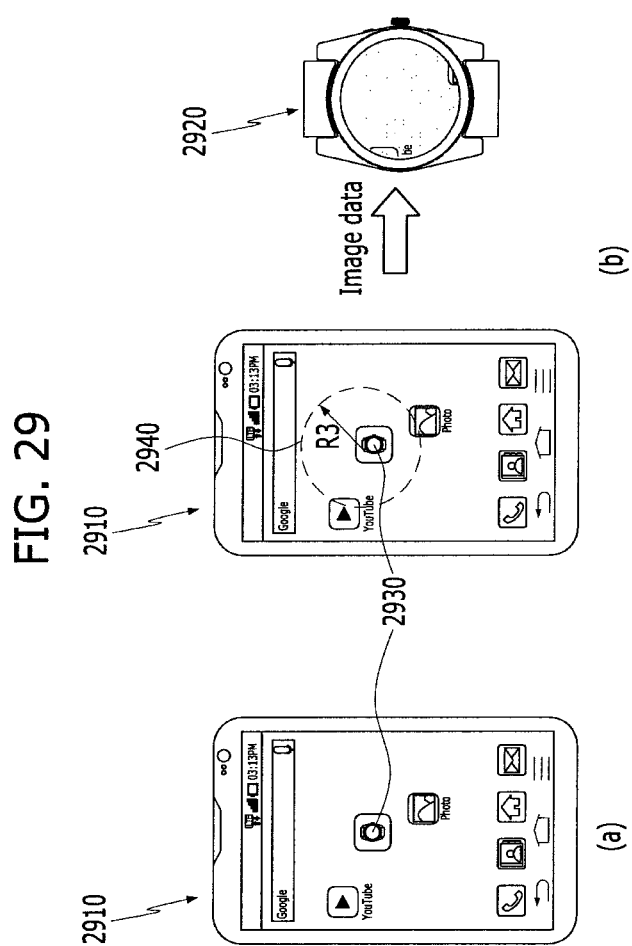

MOBILE TERMINAL AND CONTROLLING METHOD THEREOF

CROSS-REFERENCE TO RELATED APPLICATION

This application claims priority under 35 U.S.C. §119 to Korean Application No. 10-2014-0145035 filed on Oct. 24, 2014, whose entire disclosure is hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for guiding a region desired to be shared with a watch type terminal.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

As functions of the terminal are getting diversified, the terminal tends to be implemented as a multimedia player provided with complex functions such as photographing of photos or videos, playback of music or video files, game play, broadcast reception and the like for example.

In order to further increase portability of a mobile terminal, many ongoing efforts are made to research and develop a mobile terminal of a wearable-on-wrist type like a watch. Unlike typical mobile terminals, a mobile terminal of a wearable type is advantageous in being carried on a user's body at all times. A mobile terminal of a traditional bar or folder type is held by being carried in a pocket or bag. If a user needs to use the mobile terminal of the traditional bar or folder type, the user has to take it out of the pocket or bag inconveniently. Yet, since a wearable device is always carried on a user's body, it is advantageous that the user can check contents of the mobile terminal at any time.

Hence, data of a typical mobile terminal is increasingly attempted to be shared with a mobile terminal of a watch type. For instance, if an output screen of a typical mobile terminal can be shared with a mobile terminal of a watch type, a user can watch an output of the typical mobile terminal through the watch type mobile terminal without taking the typical mobile terminal out of a bag or pocket.

However, since the typical mobile terminal (e.g., a bar type mobile terminal, etc.) and the watch type mobile terminal differ from each other in size and shape of a display unit, it is necessary to set up a part to be shared between the two mobile terminals.

BRIEF DESCRIPTION OF THE DRAWINGS

The embodiments will be described in detail with reference to the following drawings in which like reference numerals refer to like elements wherein:

FIGS. 17A and 17B show diagrams for one example of sending a data file from a first mobile terminal to a second mobile terminal;

FIG. 18 is a diagram for one example of sending an item dragged & dropped to an inner region of a figure object by a user to a second mobile terminal;

FIGS. 26-28 shows diagrams for examples of sending shared data to a first mobile terminal from a second mobile terminal; and FIG. 29 shows diagrams for one example that an object is a preset image.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
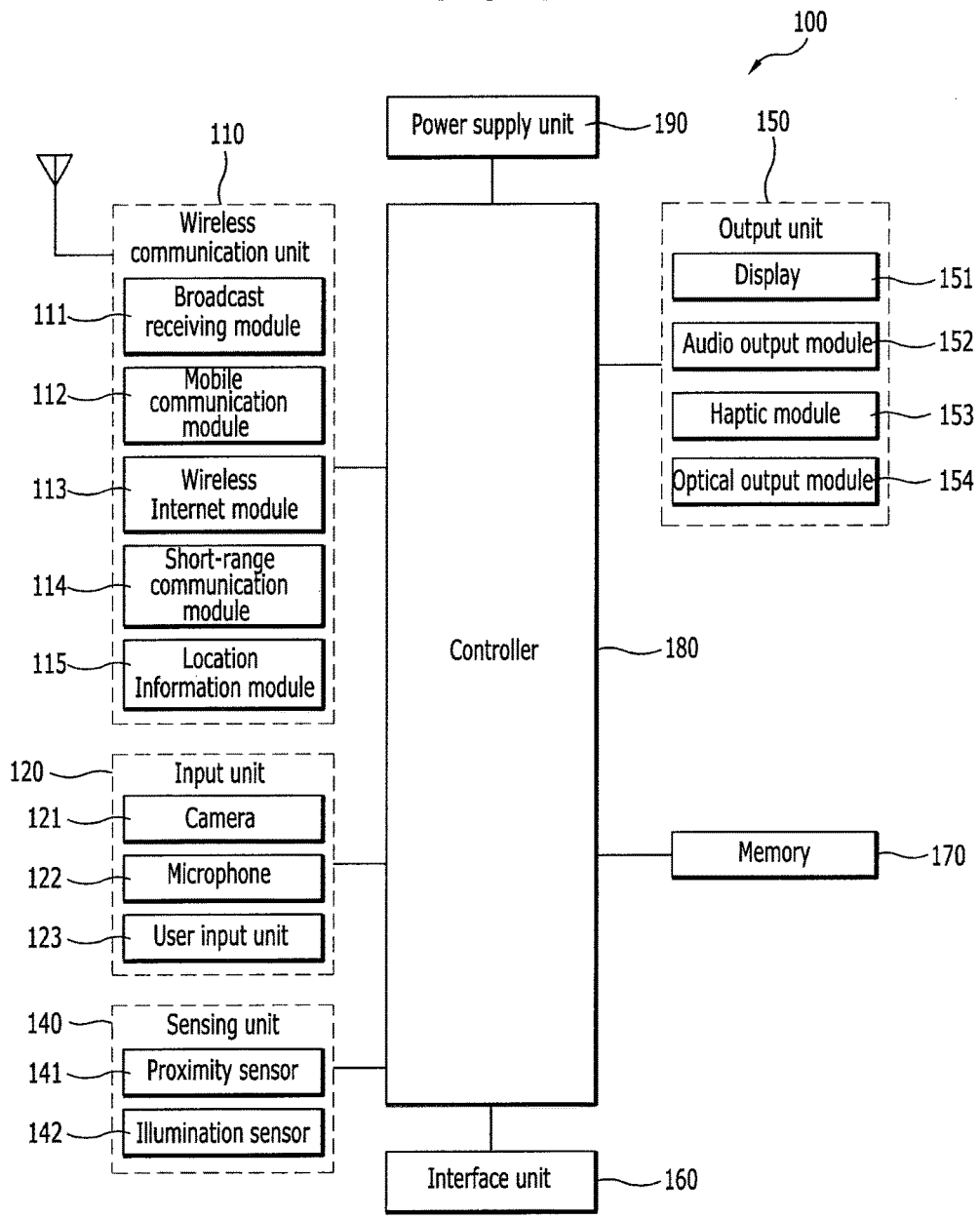
FIG. 1 is a block diagram of a mobile terminal in accordance with the present disclosure.
Figure 1B:
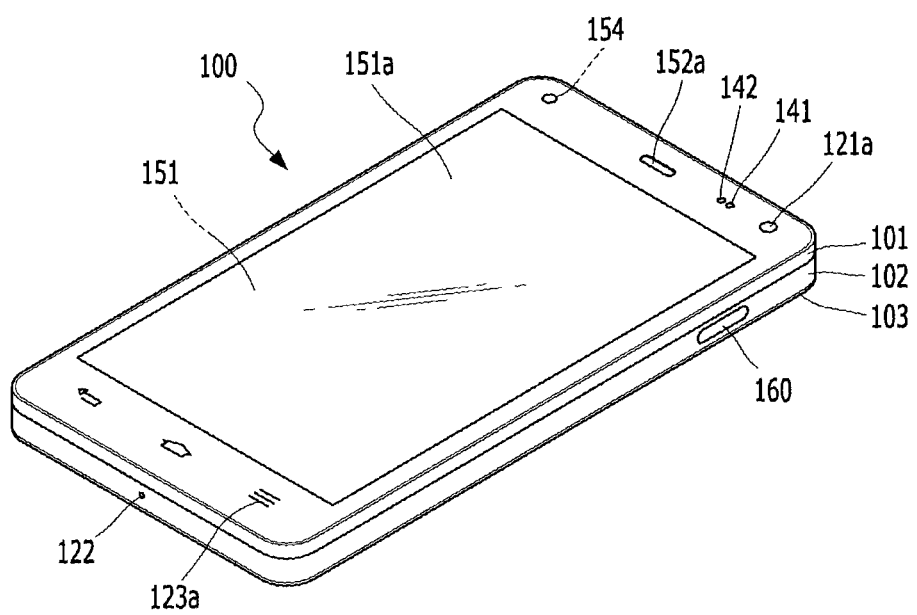
FIGS. 1B and 1C are conceptual views of one example of the mobile terminal, viewed from different directions.
Figure 1C:
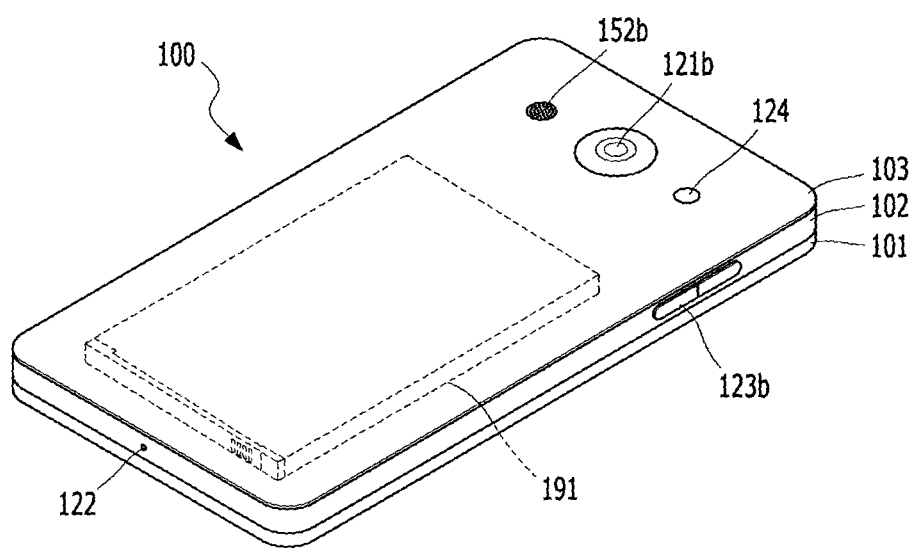

Reference is now made to FIGS. 1-1C, where FIG. 1 is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
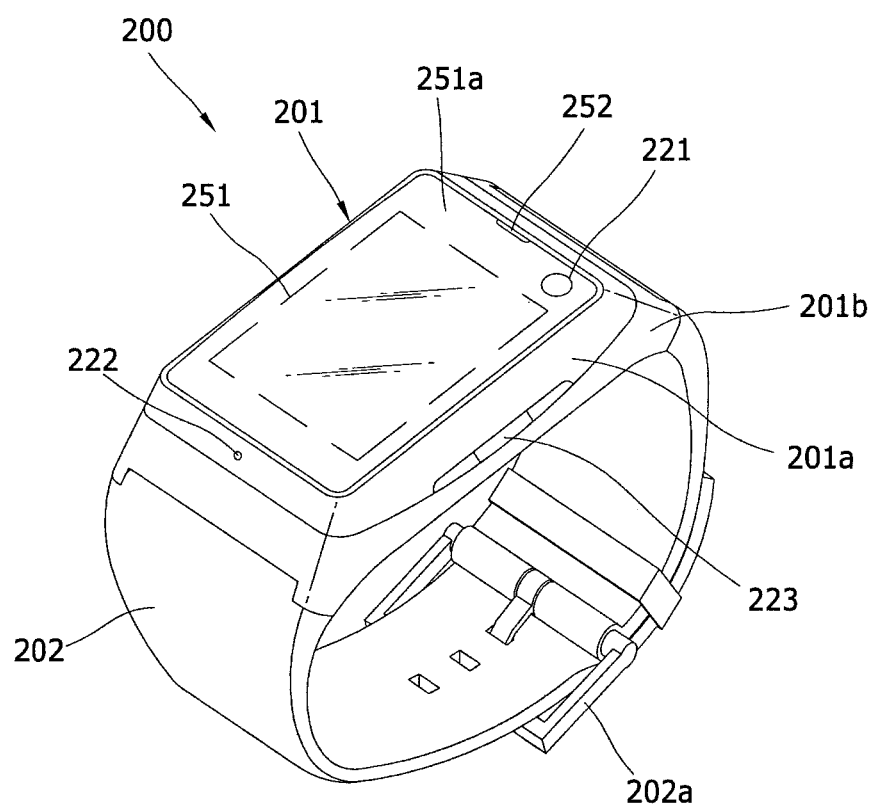
FIG. 2 is a perspective diagram for one example of a mobile terminal of a watch type related to another embodiment of the present invention.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Embodiments mentioned in the following description can be embodied based on the interworking between two mobile terminals. For clarity of the description, according to the embodiments mentioned in the following description, one of two mobile terminals is assumed as a mobile terminal of a smartphone type [FIG. 1B, FIG. 1C] and the other is assumed as a mobile terminal of a watch type [FIG. 2]. For clarity of the following description, a mobile terminal of a smartphone type shall be named a first mobile terminal and a mobile terminal of a watch type shall be named a second mobile terminal.

Yet, the present invention applied examples mentioned in the following description may be non-limited by the above assumptions. For instance, a first mobile terminal may include one of a laptop, a tablet PC and the like. And, a mobile terminal having a relatively small display unit may include one of a smartphone, a PDA, a mobile terminal of a glass type and the like.

The embodiments mentioned in the following description are preferably applied between two mobile terminals differing from each other in display unit size. In particular, the embodiments mentioned in the following description can be more easily applied if a display unit size of a first mobile terminal is greater than that of a second mobile terminal. Yet, if the two mobile terminals have the same display unit size or the display unit size of the second mobile terminal is greater than that of the first mobile terminal, the embodiments mentioned in the following description may be applicable. For clarity of the following description, assume that the display unit size of the first mobile terminal is greater than that of the second mobile terminal.

Each of the first mobile terminal and the second mobile terminal may include at least one of the components shown in FIG. 1. Although the first mobile terminal and the second mobile terminal differ from each other in configuration, each of the first mobile terminal and the second mobile terminal can include the wireless communication unit, the memory, the display unit and the controller among the components shown in FIG. 1 in common. For clarity of the description of the following embodiments, 'first' may be attached in front of each of the components of the first mobile terminal and 'second' may be attached in front of each of the components of the second mobile terminal. The present invention shall be described in detail with reference to the accompanying drawings as follows. Moreover, assume that each of a first display unit and a second display unit may include a touchscreen configured to receive a touch input.

Figure 3:
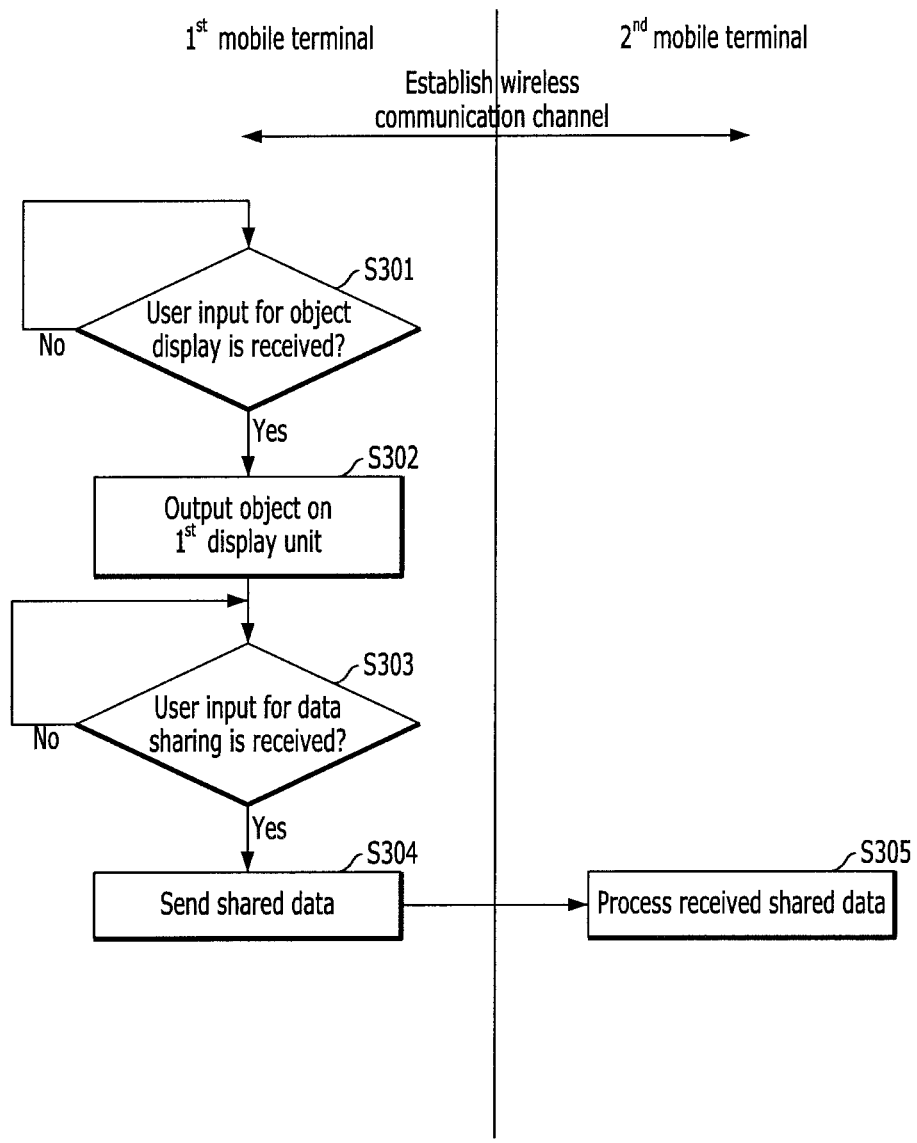
FIG. 3 is a flowchart for a sharing method according to one embodiment of the present invention.

FIG. 3 is a flowchart for a sharing method according to one embodiment of the present invention. Before the operation shown in FIG. 3 is performed, assume that a communication channel for communication has been already established between a first mobile terminal and a second mobile terminal. In particular, the first mobile terminal and the second mobile terminal can establish the communication channel mutually using such a communication technology as Bluetooth, Wi-Fi Direct, NFC, Zigbee and the like. In addition to the above-listed communication technologies, the communication channel between the first mobile terminal and the second mobile terminal can be established using one of communication technologies other than the above-listed communication technologies.

Referring to FIG. 3, if a preset touch input is received through a first mobile terminal [S301], a first controller can control an object, which guides a region to be shared with a second mobile terminal, to be outputted through a first display unit [S302]. In this case, the touch input for triggering the output of the object may include one of a drag input of drawing a prescribed trace, a touch input of tapping a display unit a prescribed number of times, a long touch input of touching a display unit over a prescribed time, and the like.

The object is provided to determine a data to share between the first mobile terminal and the second mobile terminal and may be displayed in a manner of overlaying the first display unit. And, the object may have a shape of an icon or a shape of a figure.

For instance, the first controller can output an icon representing the second mobile terminal as an object. For example, if the second mobile terminal is a watch type, the first controller can output an icon of a watch to the first display unit. For another example, if the second mobile terminal is a glasses type, the first controller can output an icon of glasses to the first display unit.

For another instance, the first controller can output a figure as an object. The first controller can represent a circle through a closed curve configuring a rectangle or circle. The first controller may represent a figure using a portion of a figure outline such as four edges of a rectangle, an arc of a circle, or the like.

The object can be displayed on the first display unit transparently or semitransparently. For example, if an object is a figure, an inside of the figure may be in a transparent or semitransparent state. Through this, it is able to prevent information, which is outputted through the first display unit, from being blocked by the object.

If an object is a figure, an inside of the figure may be vacant. Yet, the inside of the figure may be filled up with a prescribed color, or an icon or a preset image may be outputted to the inside of the figure.

Figure 4:
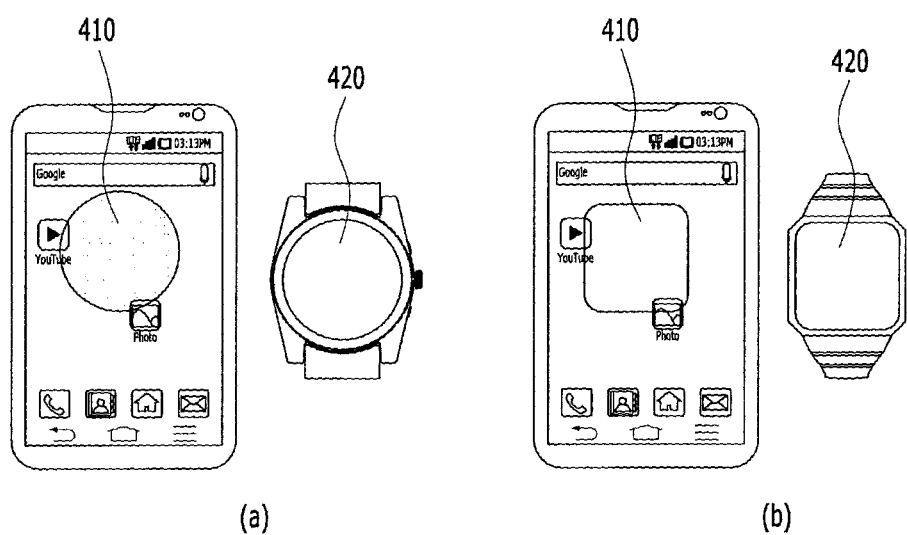
FIG. 4 shows diagrams for one example of adjusting a shape of a figure object in accordance with a shape of a second display unit.

For clarity of the following description and drawings, assume that an object has a shape of a figure, which shall be named 'figure object'. And, assume that an inner region of a figure object is in a vacant state. A shape of a figure object can be adjusted in response to a shape of a display unit of the second mobile terminal. For instance, FIG. 4 is a diagram for one example of adjusting a shape of a figure object in accordance with a shape of a second display unit. If the second display unit 420 has a circle shape, a figure object 410 displayed on the first display unit may have a circle shape [FIG. 4 (a)]. On the other hand, if the second display unit 420 has a rectangle shape, a figure object 410 displayed on the first display unit may have a rectangle shape [FIG. 4 (b)]. In this case, an aspect ratio of the figure object 410 may be equal to that of the second display unit 420.

To this end, the first mobile terminal can receive display information from the second mobile terminal. In this case, the display information may include at least one of an information on a shape of the second display unit, the aspect ratio of the second display unit, a resolution of the second display unit, and the like.

For another example different from that shown in FIG. 4, the first controller may be able to determine a shape of a figure object based on a touch input for triggering an output of the figure object. For instance, FIG. 5 is a diagram for one example of determining a shape of a figure object based on a touch input.

Figure 5:
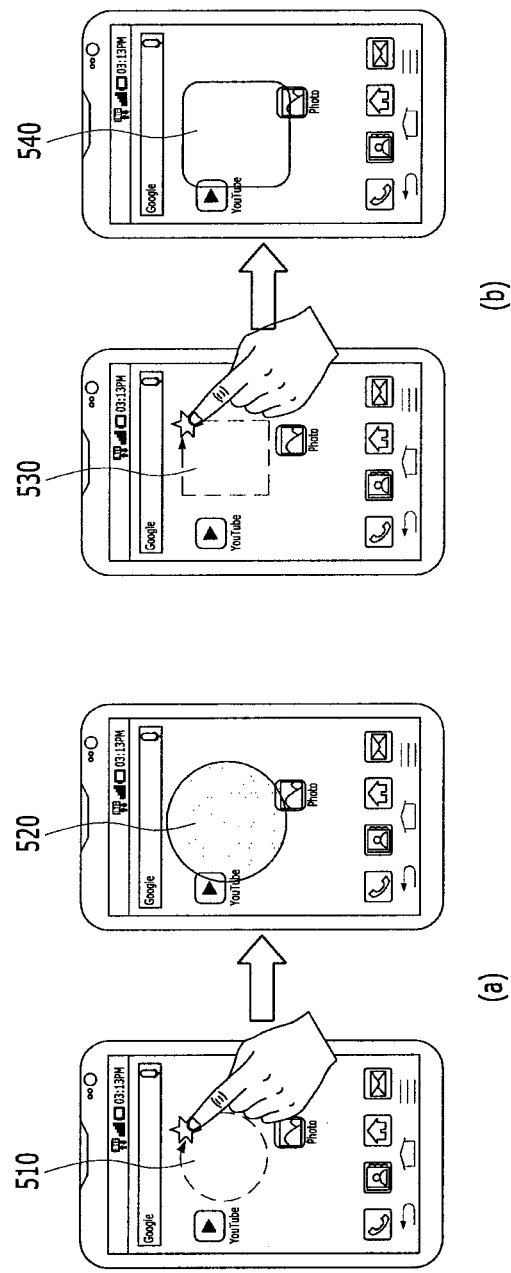
FIG. 5 shows diagrams for one example of determining a shape of a figure object based on a touch input.

Referring to FIG. 5 (a), if a drag input of dragging a pointer along a circle trace 510 on the first display unit is received, the first controller can control a figure object 520 of a circle shape to be outputted. On the other hand, referring to FIG. 5 (b), if a drag input of dragging a pointer along a rectangle trace 530 on the first display unit is received, the first controller can control a figure object 540 of a rectangle shape to be outputted.

Only if a drag input of the same trace as a shape of the second display unit is received, the first controller may control a figure object to be outputted. For instance, if the second display unit has a circle shape, as shown in FIG. 5 (a), a figure object can be outputted in response to a drag input along a circle trace 510 on the display unit. For another instance, if the second display unit has a rectangle shape, as shown in FIG. 5 (*b*), a figure object can be outputted in response to a drag input along a rectangle trace 530 on the display unit.

Figure 6:
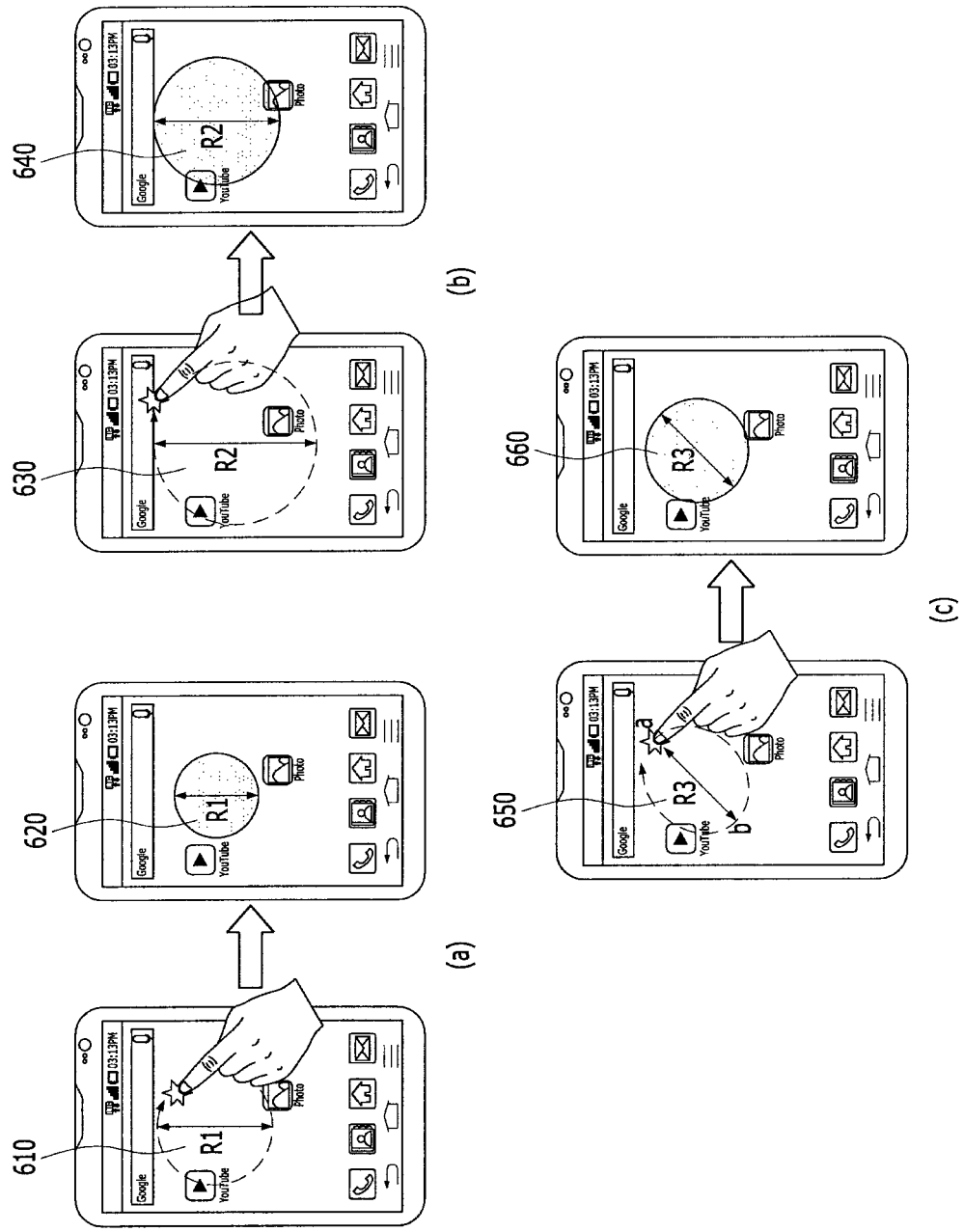
FIG. 6 shows diagrams for one example of determining a size of a figure object based on a touch input.

It is able to determine a size of a figure object based on a touch input for triggering an output of the figure object. For instance, FIG. 6 is a diagram for one example of determining a size of a figure object based on a touch input. According to the example shown in FIG. 6, a touch input for triggering an output of a figure object includes a drag input of dragging a pointer along a circle trace.

Referring to FIG. 6 (*a*), if a moving trace 610 of a pointer has a circle shape having a diameter R1, the first controller can control a figure object 620 of a circle shape having a diameter R1 to be outputted. On the other hand, referring to FIG. 6 (*b*), if a moving trace 630 of a pointer has a circle shape having a diameter R2, the first controller can control a figure object 640 of a circle shape having a diameter R2 to be outputted.

Yet, it is hardly expected that a user drags a pointer along a trace of a circle on the first display unit precisely. Hence, in case that a pointer is dragged to move along a trace 650 of a distorted circle, the first controller can output a figure object of a circle shape having a diameter set to a distance between a point touched with a pointer and a point farthest from the touched point or a distance between two points most spaced apart from each other on the trace of the distorted circle. For instance, according to the example shown in FIG. 6 (*c*), outputted is a figure object 660 of a circle shape having a diameter set to a distance R3 between a pointer drag start point 'a' and a point 'b' most spaced apart from the point 'a'.

On the other hand, unlike the example shown in FIG. 6, the first controller may control a figure object to be outputted in a size set to a default.

After a figure object has been displayed, the first controller can adjust a size of the figure object based on a user input. In this case, the user input for increasing the size of the figure object may include an input of applying a pinch-in to an inner region of the figure object using two pointers (i.e., an input for increasing a distance between two pointers by pushing the pointers from an inside to an outside) and the user input for decreasing the size of the figure object may include an input of applying a pinch-out to an inner region of the figure object using two pointers (i.e., an input for decreasing a distance between two pointers by drawing the pointers from the outside to the inside), by which the present invention is non-limited.

Figure 7:
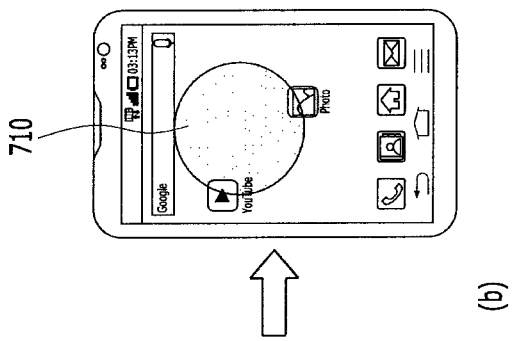
FIG. 7 shows diagrams for one example of increasing/decreasing a size of a figure object.

For instance, FIG. 7 is a diagram for one example of increasing/decreasing a size of a figure object. Referring to FIG. 7 (*a*), if a pinch-in input is applied to an inner region of a figure object 710, the first controller can control a size of the figure object 710 to be increased. Referring to FIG. 7 (*b*), if a pinch-out input is applied to an inner region of a figure object 710, the first controller can control a size of the figure object 710 to be decreased.

A location of a figure object can be changed by a user input. For instance, if a pointer having touched an inner region of a figure object for a prescribed time is dragged to move, the first controller can control a display location of the figure object to be changed along a moving direction of the pointer.

Figure 8:
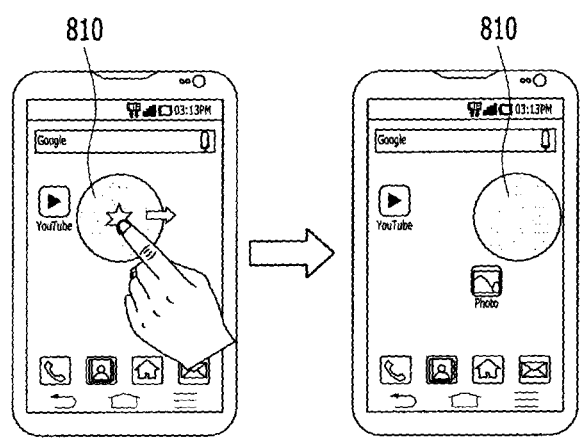
FIG. 8 is a diagram for one example of changing a location of a figure object.

For instance, FIG. 8 is a diagram for one example of changing a location of a figure object. First of all, if a pointer having touched an inner region of a figure object 810 for a prescribed time is dragged to move, the first controller can control a display location of the figure object 810 to be changed along a dragged direction of the pointer. For example, referring to FIG. 8, if the pointer is dragged to move in a right direction, the first controller can control the figure object to move in the right direction.

As the figure object moves along the pointer dragged direction, if a portion of the figure object deviates an outputtable range of the first display unit, the first controller stops displaying the figure object and is then able to control an indicator, which represents the figure object, to be outputted on behalf of the figure object.

Figure 9:
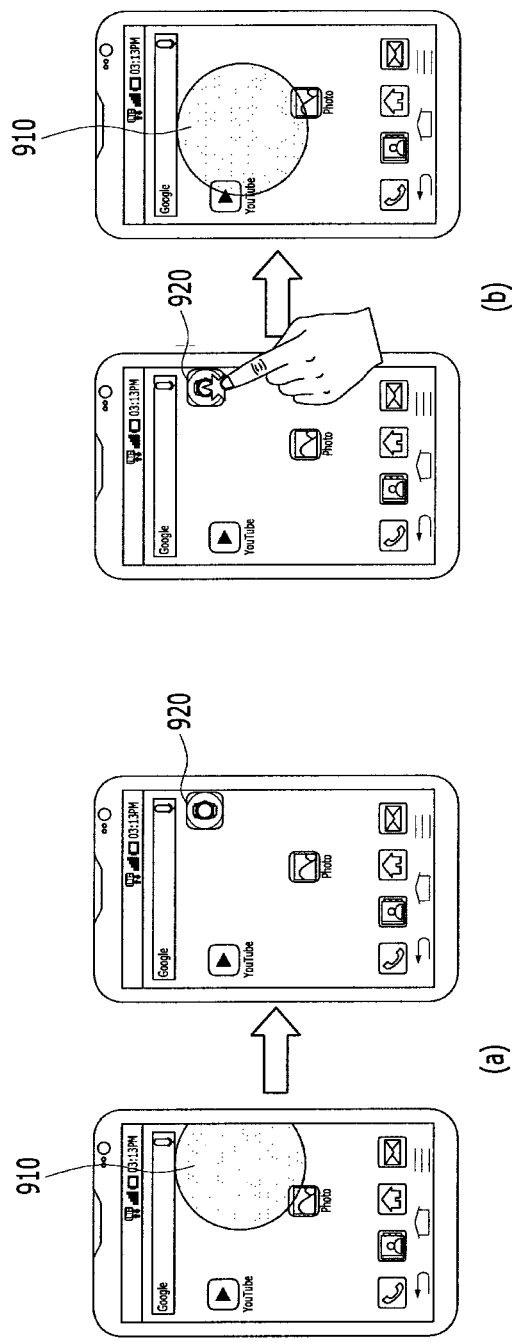
FIG. 9 shows diagrams for one example of outputting an indicator representing a figure object instead of the figure object.

For instance, FIG. 9 is a diagram for one example of outputting an indicator representing a figure object instead of the figure object. First of all, if a pointer having touched an inner region of a figure object for a prescribed time is dragged to move in a prescribed direction, the first controller can control the figure object to move along the dragged direction of the pointer. In this case, referring to FIG. 9 (*a*), if a portion of the figure object moves away from the first display unit (or, the pointer is released from the first display unit while a portion of the figure object is out of the first display unit), the first controller stops displaying the figure object and is able to control an indicator representing the figure object to be outputted.

In order to prevent informations displayed on the first display unit from being blocked by the indicator, the first controller may control the indicator to be outputted through an edge of the first display unit. In this case, a displayed location of the indicator can be changed by a user input as well.

If the indicator is touched, referring to FIG. 9 (*b*), the first controller ends the output of the indicator and controls the display of the figure object to be resumed.

A representative image representing the second mobile terminal may be outputted on the indicator. For instance, if the second mobile terminal is a watch type mobile terminal, a watch image can be displayed on the indicator. For another instance, an icon of an application currently running through the second mobile terminal or an icon of an application most recently run through the second mobile terminal can be outputted on the indicator. According to the examples shown in FIG. 9 (*a*) and FIG. 9 (*b*), a watch image is displayed on the indicator to indicate that the second mobile terminal is a watch type.

According to the embodiments mentioned in the above description, in case that a preset touch input is received by the first mobile terminal, a figure object is outputted. Unlike the described examples, if a wireless communication channel is established between the first mobile terminal and the second mobile terminal, the first controller can control a figure object to be directly outputted. For another example, if a wireless communication channel is established between the first mobile terminal and the second mobile terminal, the first controller outputs an indicator representing a figure object. In doing so, if the indicator is touched, the first controller may control the figure object to be outputted.

While the object is outputted, if a preset user input is received [S303], the first controller can send data indicated by the object to the second mobile terminal [S304]. If so, the second controller outputs the shared data received from the first mobile terminal. Thus, the second controller can process the received shared data. one example of sharing data between the first mobile terminal and the second mobile terminal is described in detail with reference to the accompanying drawings as follows.

Figure 10:
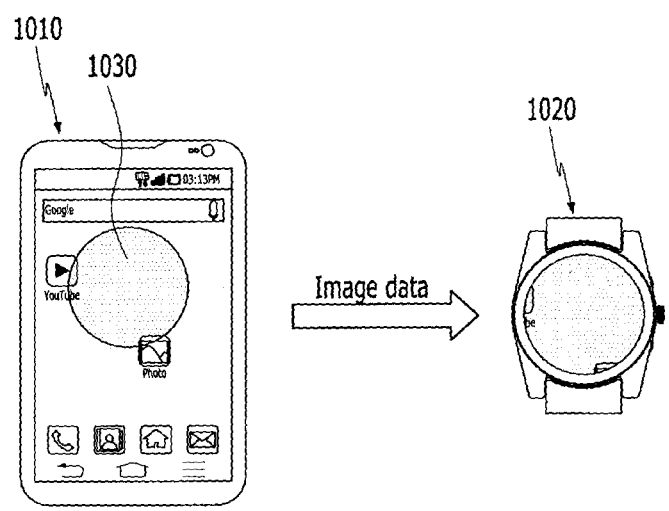
FIG. 10 is a diagram for one example of sharing a region indicated by a figure object in a real-time output screen of a first mobile terminal with a second mobile terminal.

FIG. 10 is a diagram for one example of sharing a region indicated by a figure object in a real-time output screen of a first mobile terminal with a second mobile terminal.

Referring to FIG. 10, after a figure object 1030 has been configured, if a preset user input is received, the first controller of the first mobile terminal 1010 encodes an image data of a partial region indicated by the figure object in an output screen of the first display unit and is then able to send the encoded image data to the second mobile terminal 1020.

The second controller can decode and output the received image data. Hence, like the example shown in FIG. 10, the second mobile terminal 1020 can output a copy image of the partial region in the output screen of the first mobile terminal 100.

In FIG. 10, a user input for triggering a data sharing may include one of various touch input types such as an input of touching an inner region of a figure object over a prescribed time, an input of flicking to move a pointer currently touching an inner region of a figure object over a prescribed time in a prescribed direction, an input of flicking or dragging to move a prescribed number of pointers currently touching an inner region of a figure object in a prescribed direction, an input of tapping an inner region of a figure object with a pointer a prescribed number of times, and the like. Moreover, the first controller displays an icon, a button and/or the like on an inner region of a figure object. If the icon, the button or the like is touched, the first controller may start the data sharing.

If a size or location of a figure object on the first display unit is changed, an output of the second mobile terminal can be changed as well.

Figure 11A:
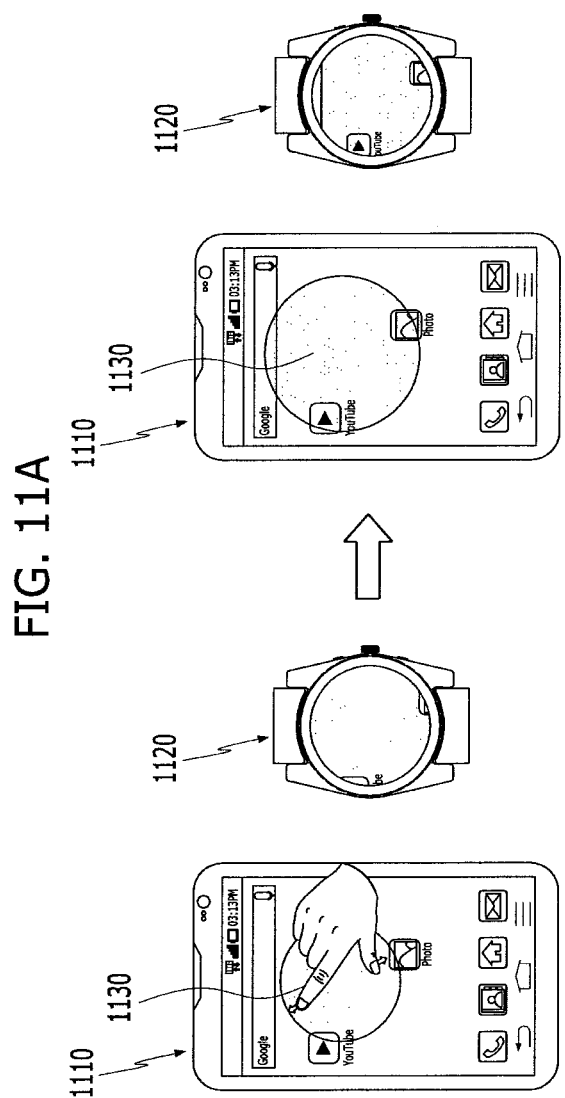
FIG. 11A and FIG. 11B are diagrams of an output change in a second mobile terminal in response to a size/location change of a figure object.
Figure 11B:
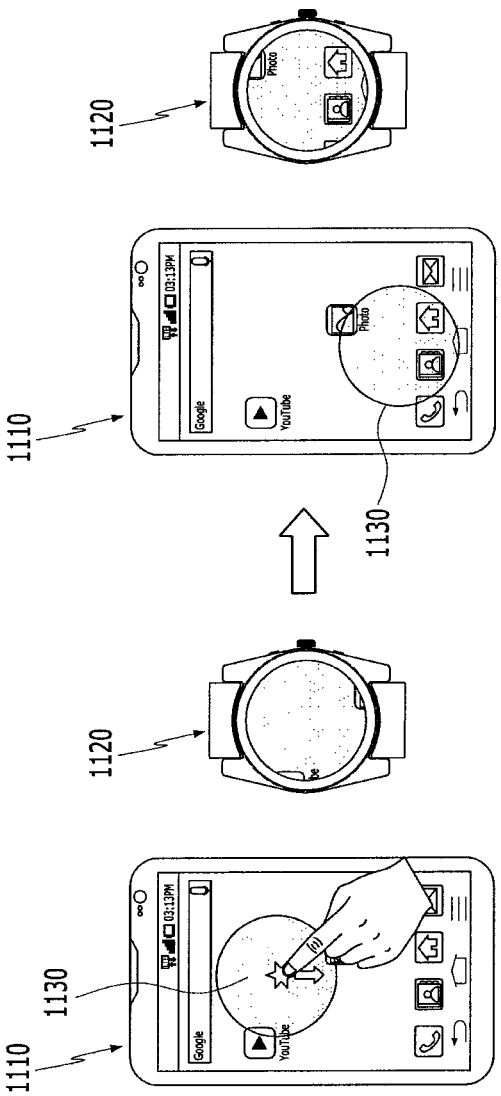

For instance, FIG. 11A and FIG. 11B are diagrams of an output change in a second mobile terminal in response to a size/location change of a figure object.

Referring to FIG. 11A, in case that a size of a figure object 1130 is increased, an output of the second mobile terminal 1120 is reduced but more informations (i.e., a wider region in an output screen of the first display unit) may be outputted [FIG. 11A].

In case that a size of the figure object 1130 is decreased, an output of the second mobile terminal 1120 is enlarged but information less than previous information (i.e., a narrower region in an output screen of the first display unit) may be outputted [not shown in the drawing].

If a location of a figure object is changed, the first controller encodes an image data corresponding to the changed location and is then able to send the encoded image data to the second mobile terminal. For instance, referring to FIG. 11B, as a figure object 1130 moves into a bottom part of the display unit, an output of the second mobile terminal 1020 is changed into a bottom part of the first display unit from the top part of the first display unit.

As mentioned in the foregoing description with reference to FIG. 7 and FIG. 8, it is able to adjust a size or location of a figure object based on a user's touch input. In case that the second mobile terminal decodes and outputs an image data received from the first mobile terminal, the first controller may adjust a size or location of a figure object by a remote control of the second mobile terminal.

Figure 12A:
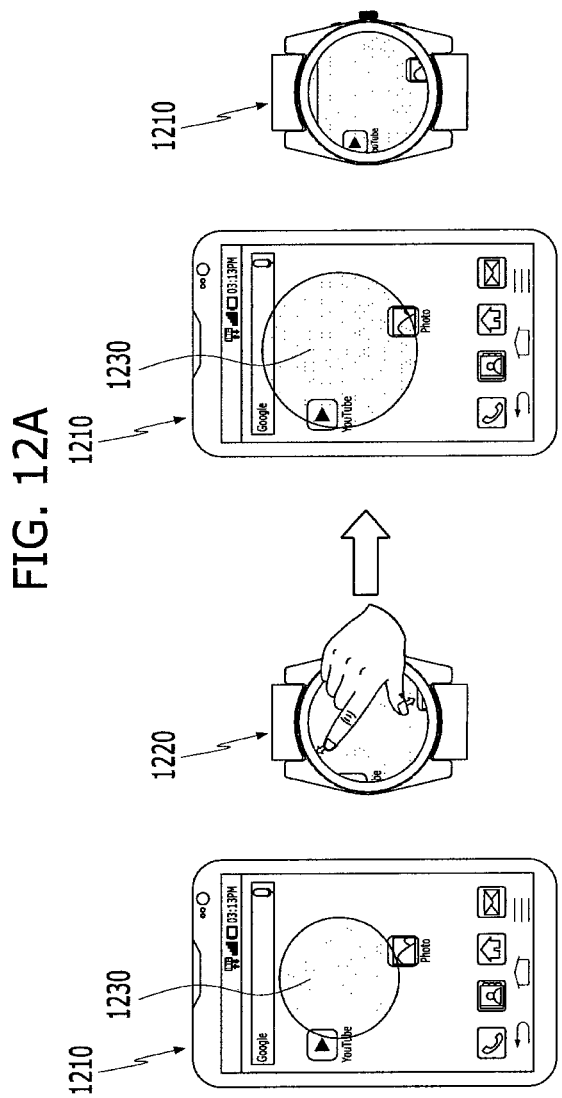
FIG. 12A and FIG. 12B are diagrams for one example of adjusting a size of a figure object by a remote control of a second mobile terminal.
Figure 12B:
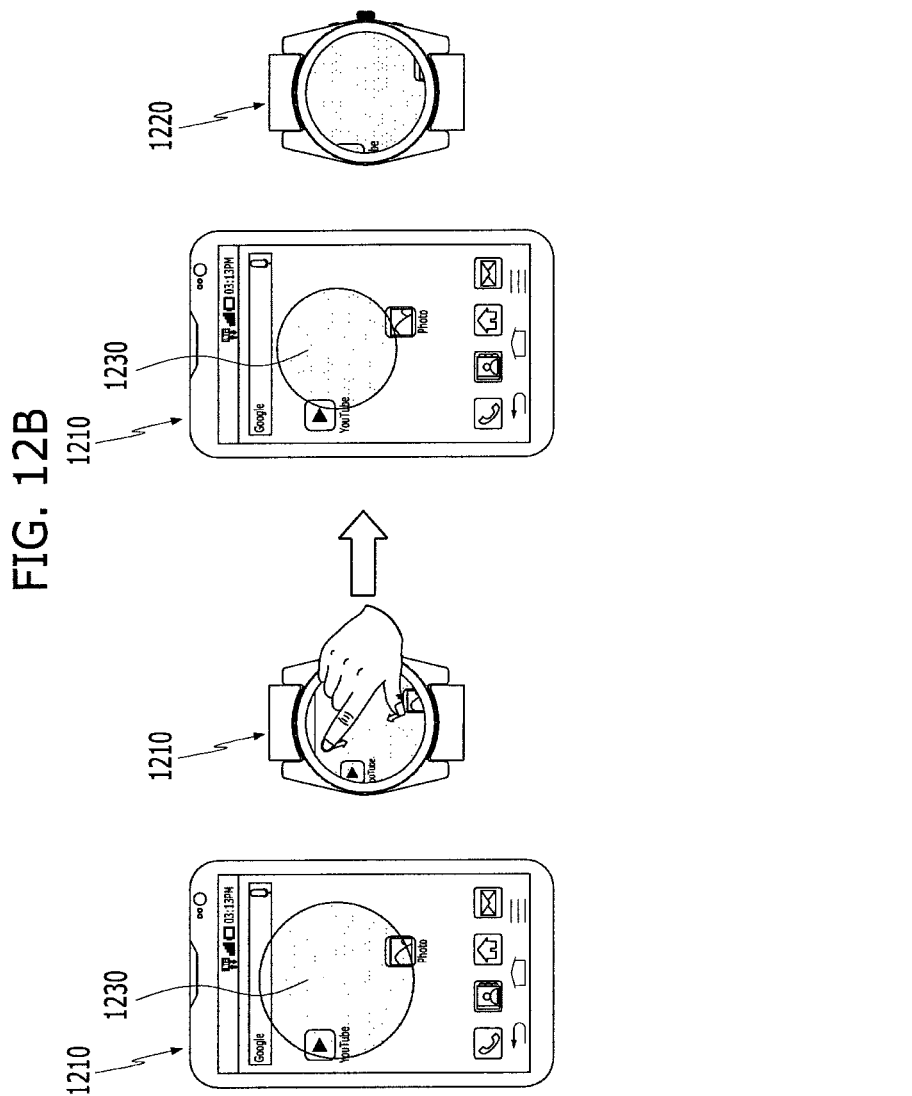

For instance, FIG. 12A and FIG. 12B are diagrams for one example of adjusting a size of a figure object by a remote control of a second mobile terminal. While the second mobile terminal 1220 is outputting a partial region of a real-time output screen of the first mobile terminal 1210, if a user input for enlarging a figure object 1230 is received through the second mobile terminal 1220, the second controller can send a remote control command for instructing to enlarge a size of the figure object 1230 to the first mobile terminal 1210. If so, the first controller can increase a size of the figure object 1230 in response to the remote control command [FIG. 12A].

On the other hand, if a user input for reducing a figure object 1230 is received through the second mobile terminal 1220, the second controller can send a remote control command for instructing to reduce a size of the figure object 1230 to the first mobile terminal 1210. If so, the first controller can decrease a size of the figure object 1230 in response to the remote control command [FIG. 12B].

According to the example shown in FIG. 12A and FIG. 12B, the user input for increasing the size of the figure object may include a pinch-in input using two pointers on the second display unit (i.e., an input of increasing a distance between two pointers by pushing the pointers from an inside to an outside) and the user input for decreasing the size of the figure object may include a pinch-out input using two pointers on the second display unit (i.e., an input of decreasing a distance between two pointers by drawing the pointers from the outside to the inside). Yet, the user inputs for adjusting the size of the figure object is non-limited by the above-described example.

Figure 13:
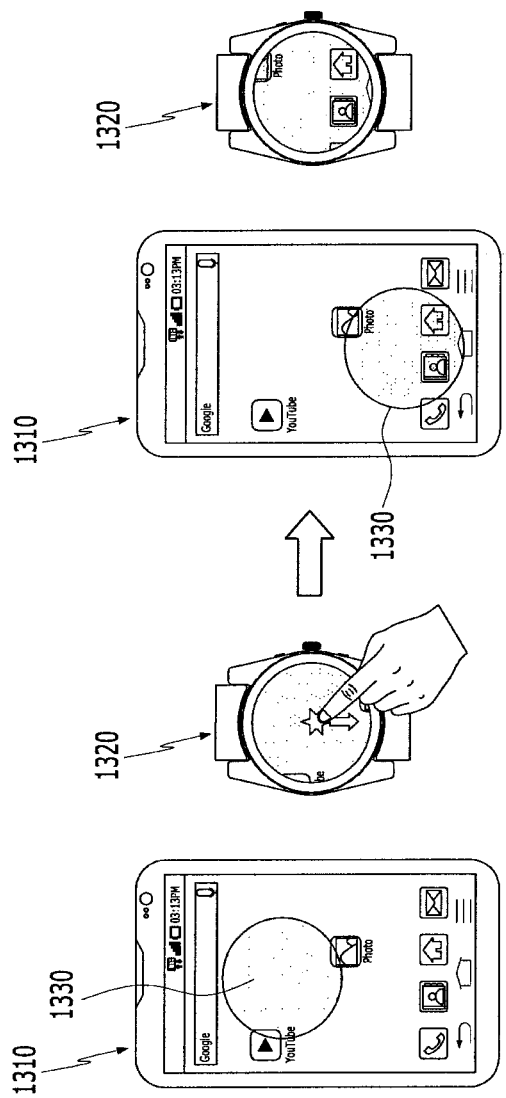
FIG. 13 is a diagram for one example of changing a location of a figure object by a remote control of a second mobile terminal.

FIG. 13 is a diagram for one example of changing a location of a figure object by a remote control of a second mobile terminal. While the second mobile terminal 1320 is outputting a partial region of a real-time output screen of the first mobile terminal 1310, if a user input of dragging to move a pointer in a prescribed direction is received through the second mobile terminal 1320, the second controller can send a remote control command for instructing to move a figure object 1330 along a dragged direction of the pointer (or, along a direction opposite to the pointer dragged direction) to the first mobile terminal 1210. If so, the first controller can change a location of the figure object 1330 in response to the remote control command [FIG. 13].

According to the example shown in FIG. 13, the user input for changing the location of the figure object includes the drag input of dragging to move the pointer in a prescribed direction. Yet, the user input for adjusting the size of the figure object is non-limited by the example shown in the drawing.

One example for the first mobile terminal to send a capture image to the second mobile terminal is described in detail as follows.

Figure 14:
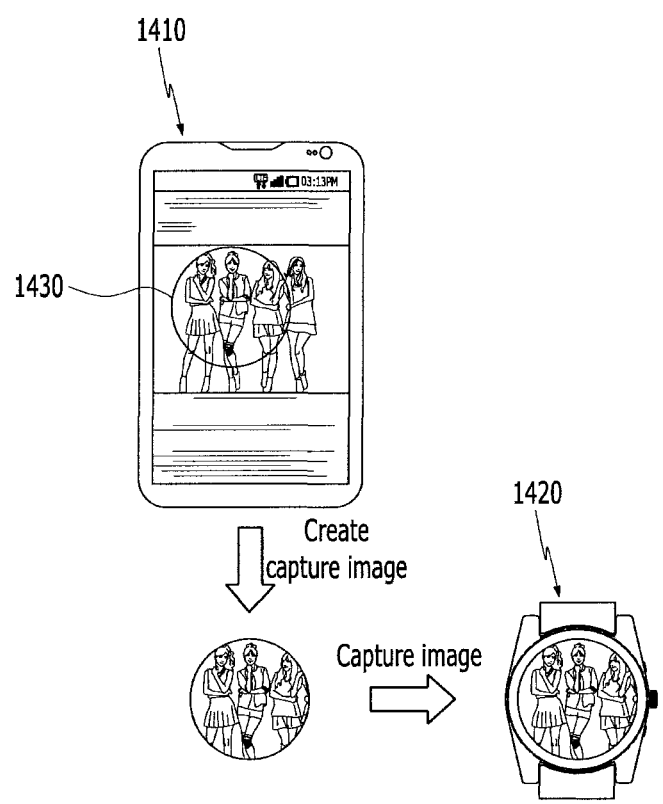
FIG. 14 is a diagram for one example of sending a capture image of capturing a region indicated by a figure object in a real-time output screen of a first mobile terminal to a second mobile terminal.

FIG. 14 is a diagram for one example of sending a capture image of capturing a region indicated by a figure object in a real-time output screen of a first mobile terminal to a second mobile terminal.

Referring to FIG. 14, after a figure object has been configured, if a preset user input is received, the first controller captures a partial region indicated by a figure object 1430 in an output screen of the first display unit and is then able to send a created capture image to the second mobile terminal 1420.

If the capture image is received from the first mobile terminal 1410, the second controller can output the received capture image. Hence, the capture image created from capturing a portion of a real-time output screen of the first mobile terminal 1410 may be outputted from the second mobile terminal 1420.

In FIG. 14, a user input for triggering a data sharing may include one of various touch input types such as an input of touching an inner region of a figure object over a prescribed time, an input of flicking to move a pointer currently touching an inner region of a figure object over a prescribed time in a prescribed direction, an input of flicking or dragging to move a prescribed number of pointers currently touching an inner region of a figure object in a prescribed direction, an input of tapping an inner region of a figure object with a pointer a prescribed number of times, and the like. Moreover, the first controller displays an icon, a button and/or the like on an inner region of a figure object. If the icon, the button or the like is touched, the first controller may start the data sharing.

Figure 15:
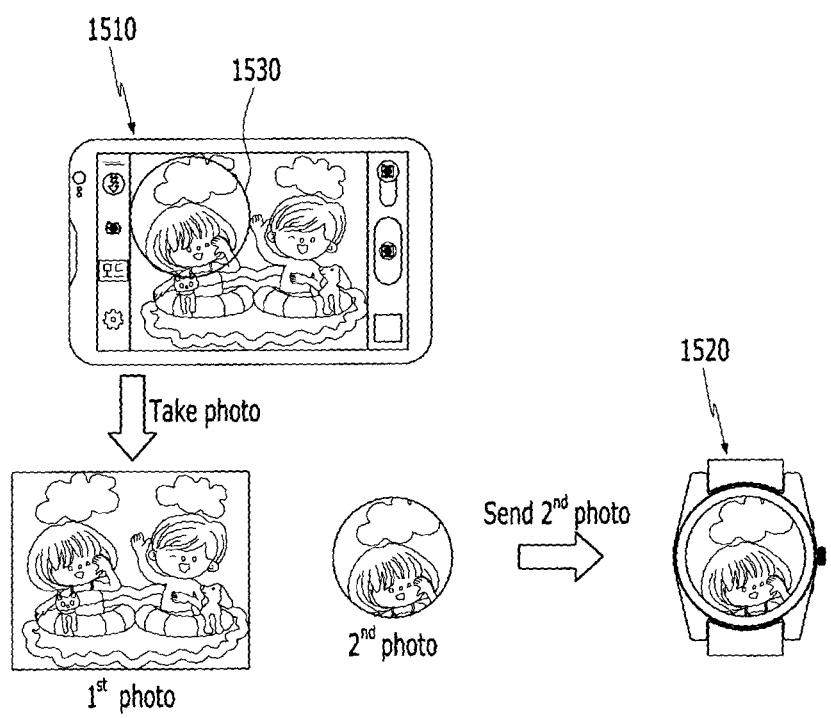
FIG. 15 is a diagram for one example of sending a photo taken through a first mobile terminal to a second mobile terminal.

FIG. 15 is a diagram for one example of sending a photo taken through a first mobile terminal to a second mobile terminal.

For clarity of the following description, assume that a preview image inputted through the first camera is currently outputted through the first display unit. In this case, the preview image may mean an image inputted through a camera before taking a photo.

Referring to FIG. 15, while a preview image is outputted, if a preset user input is received, the first controller can control a figure object 1530 to be outputted on the preview image. While the preview image is outputted, if a preset user input is received, the first controller takes a first photo of a full region of the preview image and a second photo of a partial region indicated by the figure object 1530 in the preview image and is then able to send the second photo to the second mobile terminal 1520.

Thus, through the second mobile terminal 1520, as shown in FIG. 15, the second photo may be outputted.

According to the example shown in FIG. 15, photography is performed twice on the full region of the preview image and the partial region indicated by the figure object in the preview image by the first controller. Unlike the example shown in the drawing, the first controller takes a photo of the full region of the preview image and is then able to send an image data, which is created from extracting a partial region indicated by a figure object from the taken photo, to the second mobile terminal.

In FIG. 15, a user input for triggering a data sharing may include one of various touch input types such as an input of touching a shot button, an input of touching an inner region of a figure object over a prescribed time, an input of flicking to move a pointer currently touching an inner region of a figure object over a prescribed time in a prescribed direction, an input of flicking or dragging to move a prescribed number of pointers currently touching an inner region of a figure object in a prescribed direction, an input of tapping an inner region of a figure object with a pointer a prescribed number of times, and the like. Moreover, the first controller displays an icon, a button and/or the like on an inner region of a figure object. If the icon, the button or the like is touched, the first controller may start the data sharing.

The embodiment described with reference to FIG. 15 may be applicable to shooting a video. For instance, if a video shot command is received, the first controller can shoot a first video of a full region of the preview image and a second video of a partial region indicated by a figure object in the preview image. If the video shootings are complete, the first controller can send the second video to the second mobile terminal. If a size of location of the figure object is changed in the course of the video shooting, the first controller may be able to create the second video to correspond to the changed size of location.

For another instance, the first controller may configure a second video by extracting regions indicated by the figure object in the first video. In any cases, the second mobile terminal may be able to receive the second video of shooting an inner region of the figure object from the first mobile terminal.

According to the example shown in FIG. 15, in response to a preset user input, the first controller can take two photos (or videos) simultaneously. Unlike the example shown in the drawing, the first controller may take a photo of a region indicated by a figure object once only.

Figure 16:
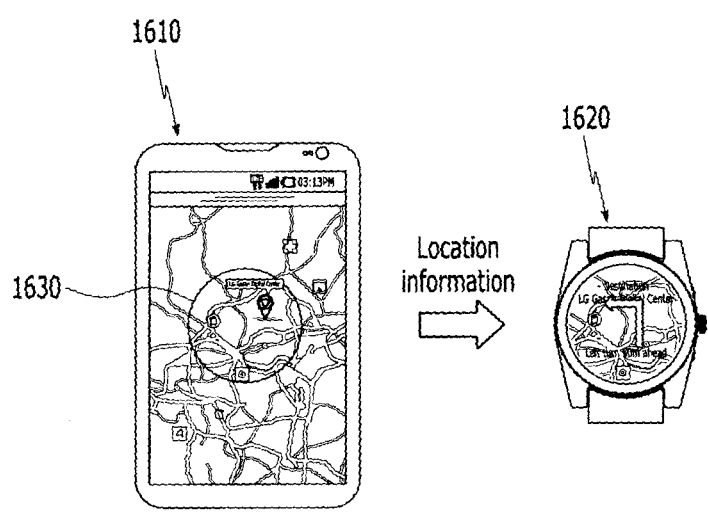
FIG. 16 is a diagram for one example of sending a location information from a first mobile terminal to a second mobile terminal.

FIG. 16 is a diagram for one example of sending a location information from a first mobile terminal to a second mobile terminal. For clarity of the following description, assume that a map screen is currently outputted through the first mobile terminal owing to running a map application or a navigation application.

Referring to FIG. 16, while a map is outputted through the first mobile terminal, if a preset user input is received, the first controller can control a figure object 1630 to be outputted on the map. As mentioned in the foregoing description with reference to FIG. 7 and FIG. 8, a size and location of a figure object can be adjusted by a user input.

While the figure object 1630 is outputted, if a preset user input is received, the first controller can send a location information corresponding to an inner region of the figure object to the second mobile terminal 1620. For instance, like the example shown in FIG. 16, if a marker 1640 indicating a specific location is contained in the inner region of the figure object, the first controller can send a location information indicated by the marker 1640 to the second mobile terminal.

If the location information is received, the second controller can set the received location information as a destination on the navigation application. Hence, through the second mobile terminal 1620, a route guide service to the location indicated by the location information received from the first mobile terminal 1610 can be provided.

FIG. 17A and FIG. 17B are diagrams for one example of sending a data file from a first mobile terminal to a second mobile terminal. In particular, FIG. 17A is a diagram for one example of sending a photo file and FIG. 17B is a diagram for one example of sending a music file.

While a photo list is outputted through the first display unit, a figure object may be displayed by a preset user input. For clarity of the description, thumbnail images on the photo list are numbered in FIG. 17A.

While a figure object 1730 is outputted, if a preset user input is received, the first controller can send a photo file selected by a figure object to the second mobile terminal 1720. For instance, the first controller can send a photo file having a thumbnail fully contained in an inner region of the figure object 1730 to the second mobile terminal. Referring to FIG. 17A (a), since the thumbnail image #5 is fully contained in the figure object 1730 of a circle shape, the first controller can send a photo file corresponding to the thumbnail image #5 to the second mobile terminal 1720.

For another instance, if at least a prescribed rate of a full region of a thumbnail image is contained in a figure object, the first controller can send a photo file mapped to the corresponding thumbnail image to the second mobile terminal. For example, if it is set to send a photo file having at least 50% of a thumbnail image contained in the figure object 1730 to the second mobile terminal, referring to FIG. 17A (b), the first controller can send photo files mapped to thumbnail images #5, #6, #8 and #9, each of which has at least 50% region contained in the figure object of the circle shape, to the second mobile terminal 1720.

While a music file list is outputted through the first display unit, a figure object can be displayed by a preset user input. For clarity of the description with reference to FIG. 7B, files on the music list are numbered.

While a figure object is outputted, if a preset user input is received, the first controller can send a music file selected by the figure object to the second mobile terminal 1720. For instance, the first controller can send a music file, which is mapped to a prescribed item located close to a central part of the figure object 1730 among the respective items configuring the music file list, to the second mobile terminal 1720. Referring to FIG. 17B (a), a music file #5 located at the central part of the figure object 1730 can be sent to the second mobile terminal 1720.

For another instance, if a plurality of items in the music file list are located across a figure object, the first controller may send a plurality of music files respectively mapped to a plurality of the items to the second mobile terminal 1720. Referring to FIG. 17B (b), since the items #3 to #7 are located across the figure object, the first controller may be able to send the music files mapped to the items #3 to #7 to the second mobile terminal 1720.

In FIG. 17A and FIG. 17B, a user input for triggering a data file sending may include one of various touch input types such as an input of touching an inner region of a figure object over a prescribed time, an input of flicking to move a pointer currently touching an inner region of a figure object over a prescribed time in a prescribed direction, an input of flicking or dragging to move a prescribed number of pointers currently touching an inner region of a figure object in a prescribed direction, an input of tapping an inner region of a figure object with a pointer a prescribed number of times, and the like. Moreover, the first controller displays an icon, a button and/or the like on an inner region of a figure object. If the icon, the button or the like is touched, the first controller may start the data sharing.

According to the examples shown in FIG. 17A and FIG. 17B, a photo file or a music file is sent to the second mobile terminal. Moreover, a type of a data file sent to the second mobile terminal is non-limited by a photo file or a music file. By applying the embodiments described with reference to FIG. 17A and FIG. 17B, various kinds of data files can be sent to the second mobile terminal from the first mobile terminal.

According to the example shown in FIG. 17B, the first mobile terminal sends the music file to the second mobile terminal. Moreover, in case of attempting to send a playable multimedia file such as a music file, a video file or the like, the first mobile terminal may send a streaming data for streaming to play a multimedia file to the second mobile terminal instead of a multimedia file. If the streaming data is received, the second mobile terminal may be able to play the multimedia file (e.g., video, music, etc.) saved in the mobile terminal by streaming.

According to the examples shown in FIG. 17A and FIG. 17B, a data file to be sent to the second mobile terminal is determined depending on a location of a figure object on the data file list. Unlike the examples shown in the drawings, the first controller may send a data file mapped to an item dragged & dropped to a figure object by a user to the second mobile terminal.

FIG. 18 is a diagram for one example of sending an item dragged & dropped to an inner region of a figure object by a user to a second mobile terminal. For clarity of the following description, assume that a photo file list is currently outputted through the first display unit. Moreover, the following embodiment described with reference to FIG. 18 is applicable to other files as well to the photo file.

Referring to FIG. 18, while a photo file list is outputted, a figure object 1830 can be outputted in response to a preset user input. Thereafter, after a pointer currently touching a prescribed thumbnail on the photo file list has been dragged to move to an inside of the figure object 1830, if the touch is released, the first controller can send a photo file mapped to the thumbnail dragged & dropped to the inside of the figure object 1830 to the second mobile terminal 1820.

Since the thumbnail #3 on the photo file list is dragged & dropped to an inner region of the figure object 1830, as shown in FIG. 18, the photo file mapped to the thumbnail #3 may be sent to the second mobile terminal 1820.

Before a photo file is sent to the second mobile terminal, the first controller can control a selection menu, which queries whether to send the photo file to the second mobile terminal, to be outputted. In case that a user input for the selection menu is to accept that the photo file will be sent to the second mobile terminal [e.g., a case that a button 'send' shown in FIG. 18 is touched], the first controller can send the photo file to the second mobile terminal. In case that a user input for the selection menu is to decline that the photo file will be sent to the second mobile terminal [e.g., a case that a button 'cancel' shown in FIG. 18 is touched], the first controller can cancel to send the photo file to the second mobile terminal.

The embodiment for outputting a selection menu before sending a data file may be applicable to the examples shown in FIG. 17A and FIG. 17B as well. In particular, based on a user input to the selection menu, the first controller can determine whether to send a data file to the second mobile terminal.

According to the embodiments mentioned in the above description, while a figure object is outputted, if a preset user input is received, a shared data is sent to the second mobile terminal from the first mobile terminal, for example. Unlike the example shown in the drawing, if a figure object is outputted, the first controller may be able to directly send a shared data indicated by the figure object to the second mobile terminal.

The first controller can control a menu, which can be run in the second mobile terminal, to be outputted through the first display unit. If the menu is selected, the first controller can send a remote control command corresponding to the selected menu to the second mobile terminal. In this case, the outputted menu can be adjusted depending on a type of data indicated by a figure object, an application currently running through the second mobile terminal, and/or the like. Examples of sending a remote control command from the first mobile terminal to the second mobile terminal are described in detail with reference to the accompanying drawings as follows.

Figure 19:
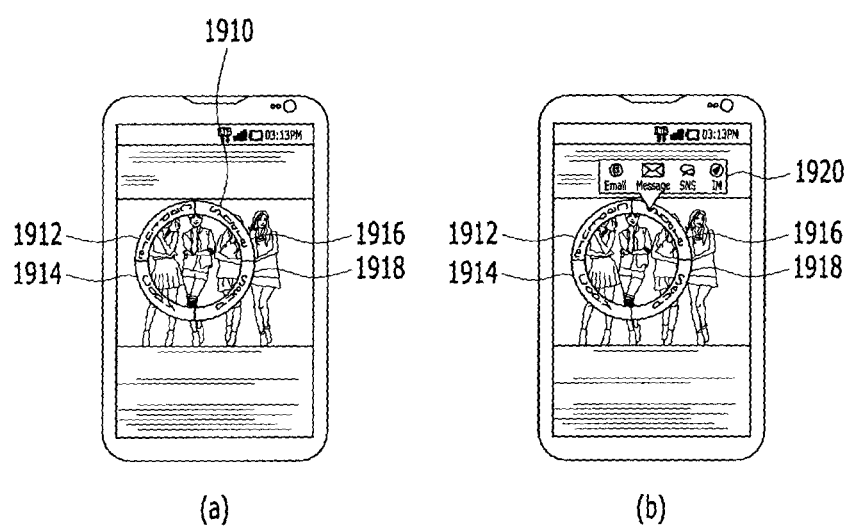
FIG. 19 is a diagram to describe one example for a first mobile terminal to send a remote control command to a second mobile terminal.

FIG. 19 is a diagram to describe one example for a first mobile terminal to send a remote control command to a second mobile terminal. For clarity of the following description, assume that the second mobile terminal currently outputs a portion (i.e., a region indicated by a figure object) of an output screen of the first display unit.

First of all, while a figure object 1910 is outputted, if a preset user input is received, the first controller can control a menu, which can be run in the second mobile terminal, to be outputted.

Referring to FIG. 19 (a), menus for 'capture' 1912, 'copy' 1914, 'share' 1916, 'send' 1918 and the like are outputted to a rim of the figure object 1910.

If the capture button 1912 is touched, the first controller can send a capture command to the second mobile terminal. If so, the second controller may be able to capture and save an output of the second display unit. Hence, the second mobile terminal can have the same effect as capturing a partial region indicated by the figure object in a whole output of the first display unit.

If the copy button 1914 is touched, the first controller can send a copy command to the second mobile terminal. If so, the second controller captures an output of the second display unit and is then able to temporarily save the captured image in the second memory. The image temporarily saved in the second memory can be utilized in composing a document and the like in the future.

If the share button 1916 is touched, the first controller can send a share command to the second mobile terminal. If so, the second controller captures an output of the second display unit and is then able to control submenus, which are provided to share the captured image with others, to be outputted.

If the send button 1918 is touched, the first controller can send a send command to the second mobile terminal. If so, the second controller captures an output of the second display unit and is then able to control a screen, which is provided to compose an image having the captured image attached thereto or a message having the captured image attached thereto, to be outputted.

According to the example mentioned in the above description, If a prescribed one of the menus is touched, the first controller can directly send a remote control command to the second mobile terminal. If a submenu exists in the touched menu, the first controller may display the submenu of the touched menu.

For instance, if the share button shown in FIG. 19 (*a*) is touched, the first controller can control the submenu 1920, which is provided to determine a sending medium for sharing the capture image, to be outputted. According to the example shown in FIG. 19 (*b*), as the submenu 1920 for the share button 1916, a message button, an email button, an SNS button and an IM (instant message) button are outputted. If a prescribed button of the submenu is touched and a second submenu subordinate to the touched submenu does not exist, the first controller can send a remote control command to the second mobile terminal.

For instance, referring to FIG. 19 (*b*), if the email item is touched, the first controller can send a remote control command for triggering an email application to the second mobile terminal. If so, the second controller captures an output of the second display unit and is then able to control a screen, which is provided to compose a capture image attached email, to be outputted.

The example of the menus shown in FIG. 19 is provided for clarity of the description, by which the present invention is non-limited. Moreover, other menus can be further outputted in addition to the menus shown in the drawing. For instance, menus for 'upload', 'print', 'settings', 'cancel' and the like can be outputted in addition. The menu 'upload' may be provided to trigger an operation for the second mobile terminal to upload a capture image to a prescribed storage place (e.g., a cloud serer, etc.). The menu 'print' may be provided to trigger an operation for the second mobile terminal to print a capture image. The menu 'settings' may be provided to set a quality (e.g., a capture image size, a capture image resolution, etc.) of a capture image, a print quality and the like. And, the menu 'cancel' may be provided to stop an output of menu.

In FIG. 19, a user input for triggering an output of a menu item may include one of various touch input types such as an input of touching an inner region of a figure object over a prescribed time, an input of flicking to move a pointer currently touching an inner region of a figure object over a prescribed time in a prescribed direction, an input of flicking or dragging to move a prescribed number of pointers currently touching an inner region of a figure object in a prescribed direction, an input of tapping an inner region of a figure object with a pointer a prescribed number of times, and the like.

Figure 20:
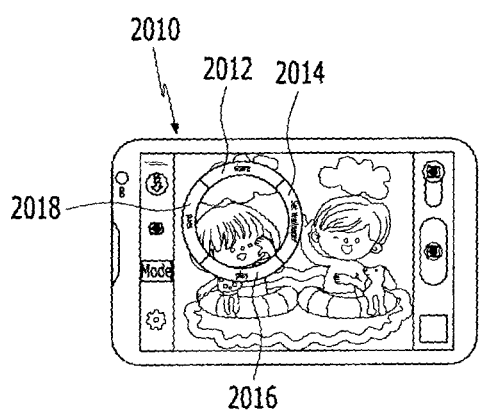
FIG. 20 is a diagram to describe another example for a first mobile terminal to send a remote control command to a second mobile terminal.

FIG. 20 is a diagram to describe another example for a first mobile terminal to send a remote control command to a second mobile terminal. For clarity of the following description, assume that a preview image inputted through the first camera is currently outputted through the first mobile terminal. And, assume that the second mobile terminal has receives a photo or video taken through the first camera from the first mobile terminal [cf. FIG. 15].

First of all, while a figure object 2010 is outputted, if a preset user input is received, the first controller can control a menu, which can be run in the second mobile terminal, to be outputted.

Referring to FIG. 20, menus such as 'share' 2012, 'set as background screen' 2014, 'play' 2016, 'delete' 2018 and the like are outputted.

If the share button 2012 is touched, the first controller can send a share command to the second mobile terminal. If so, the second controller can control submenus, which are provided to share the photo or video received from the first mobile terminal, to be outputted.

If the 'set as background screen' button 2014 is touched, the first controller can send a command for setting as a background screen to the second mobile terminal. If so, the second controller can set the photo received from the first mobile terminal or an image representing the video received from the first mobile terminal as a background screen.

If the play button 2016 is touched, the first controller can send a play command to the second mobile terminal. If so, the second controller may output the photo received from the first mobile terminal or may play the video received from the first mobile terminal.

If the delete button 2018 is touched, the first controller can send a delete command to the second mobile terminal. If so, the second controller can delete the photo or video received from the first mobile terminal.

As mentioned in the foregoing description with reference to FIG. 19 (*b*), if a selected menu item includes submenus, the first controller can display the submenus of the touched menu.

Figure 21:
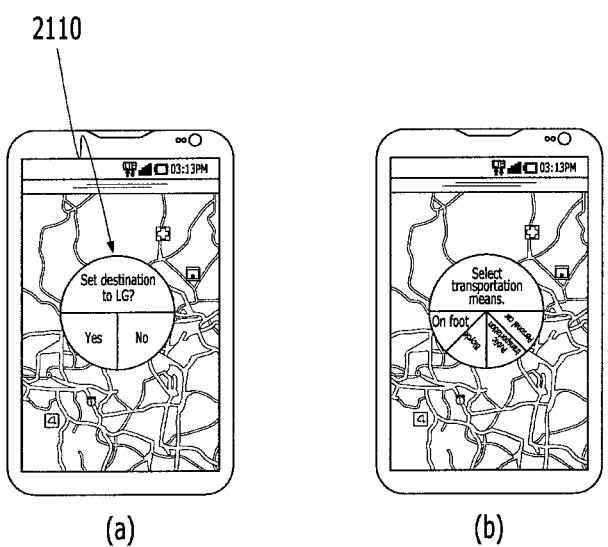
FIG. 21 is a diagram to describe further example for a first mobile terminal to send a remote control command to a second mobile terminal.

FIG. 21 is a diagram to describe further example for a first mobile terminal to send a remote control command to a second mobile terminal. For clarity of the following description, assume that a map is currently outputted through the first mobile terminal. And, assume that a navigation application is currently outputted through the second mobile terminal.

Referring to FIG. 21, while a figure object 2110 is outputted, if a preset user input is received, the first controller can control a menu, which can be run in the second mobile terminal, to be outputted. In particular, referring to FIG. 21 (*a*), the first controller can control a selection menu, which queries whether to set a destination to a place indicated by the figure object 2110, to be outputted. If a user input for accepting that the place indicated by the figure object is set as the destination is received through the selection menu, the first controller can provide a place information to the second mobile terminal. If so, the second mobile terminal set the received place information as the destination.

Thereafter, referring to FIG. 21 (*b*), the first controller can select a menu for setting a transportation means. If the transportation means is selected from the menus outputted through the first display unit, the first controller can provide the second mobile terminal with the information on the selected transportation means. If so, the second mobile terminal can provide a route guide service based on the selected transportation means.

Like the examples shown in FIG. 19 and FIG. 20, the first controller can control menus to be outputted along an outline of a figure object. If menus are outputted along the outline of the figure object, like the examples shown in FIG. 19 and FIG. 20, it is able to minimize the portion blocked by the menus.

For another instance, like the example shown in FIG. 21, the first controller can control a menu to be outputted to an inner region of a figure object. In doing so, in order to minimize a portion blocked by the menu, the first controller can output the menu semitransparently.

Figure 22:
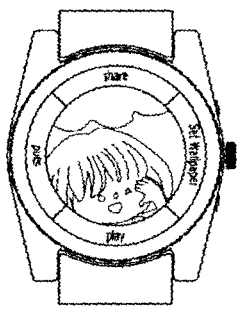
FIG. 22 is a diagram for one example of outputting a menu through a second mobile terminal.

The menus described with reference to FIGS. 19 to 21 may be outputted through the second mobile terminal. For instance, FIG. 22 is a diagram for one example of outputting a menu through a second mobile terminal. Referring to FIG. 22, if a prescribed one of the menus outputted through the second display unit is touched, the second controller may be able to execute the command corresponding to the touched menu.

In particular, the second mobile terminal may operate by receiving a remote control command from the first mobile terminal or may operate based on a touch input received from the second mobile terminal.

In doing so, the second controller may output a menu based on a user input received through the second mobile terminal or may output a menu by receiving a remote control command received from the first mobile terminal.

For instance, according to the embodiments mentioned in the foregoing description with reference to FIGS. 19 to 21, if a preset user input is received, the first controller may send a remote control command for commanding to output a menu to the second mobile terminal instead of outputting a menu through the first display unit. If so, referring to FIG. 22, the second controller can control the menu to be outputted through the second display unit.

The first mobile terminal may send a remote control command for changing a setting value of the second mobile terminal through a figure object.

Figure 23:
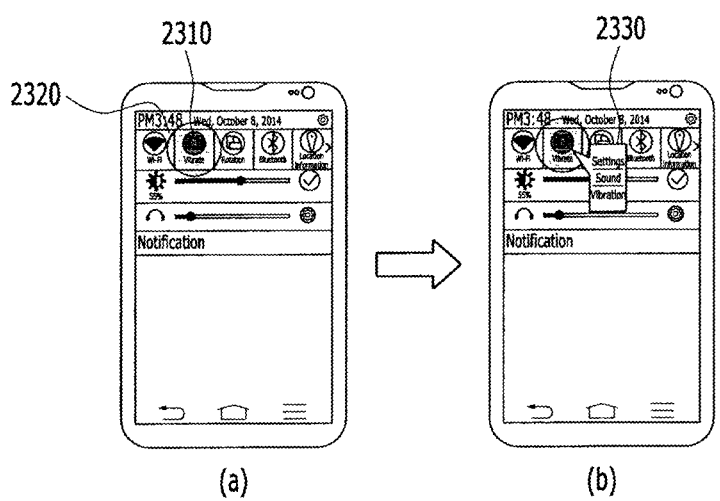
FIG. 23 shows diagrams for one example of changing a setting value of a second mobile terminal in response to a remote control command of a first mobile terminal.

For instance, FIG. 23 is a diagram for one example of changing a setting value of a second mobile terminal in response to a remote control command of a first mobile terminal.

Referring to FIG. 23, while a figure object 2320 encloses an icon 2310 for adjusting a vibration mode and an audio output mode, if a preset user input is received, the first controller can control a menu 2330, which is provided to adjust an output mode of the second mobile terminal, to be outputted.

If a 'vibrate' region in the menu 2330 is touched, the first controller can send a remote control command for instructing to set a vibration mode to the second mobile terminal. If so, the second controller can set a mode of the second mobile terminal to the vibration mode.

If a 'sound' region in the menu 2330 is touched, the first controller can send a remote control command for instructing to set an audio output mode to the second mobile terminal. If so, the second controller can set a mode of the second mobile terminal to the audio output mode.

Figure 24:
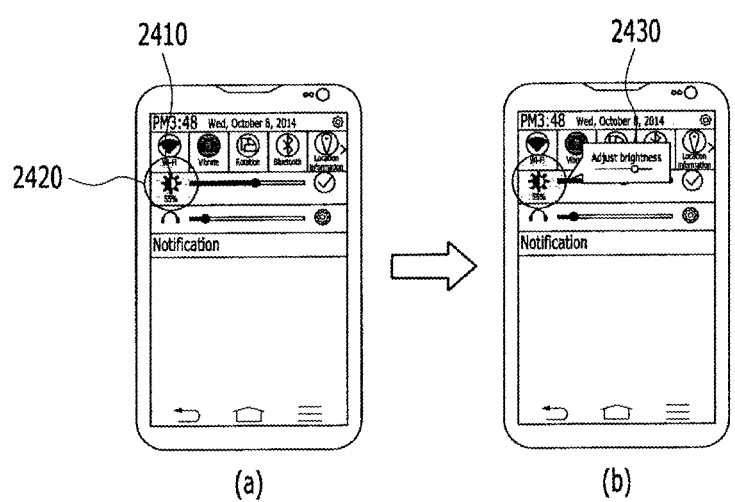
FIG. 24 shows diagrams for another example of changing a setting value of a second mobile terminal in response to a remote control command of a first mobile terminal.

FIG. 24 is a diagram for another example of changing a setting value of a second mobile terminal in response to a remote control command of a first mobile terminal.

Referring to FIG. 24, while a figure object 2420 encloses an icon 2410 for increasing a brightness, if a preset user input is received, the first controller can control a menu 2330, which is provided to adjust a brightness of the second mobile terminal, to be outputted.

If a user input for increasing a brightness is received through the menu, the first controller may send a remote control command for increasing a brightness of the second display unit to the second mobile terminal. If so, the second controller can increase the brightness of the second display unit.

If a user input for decreasing a brightness is received through the menu, the first controller may send a remote control command for decreasing a brightness of the second display unit to the second mobile terminal. If so, the second controller can decrease the brightness of the second display unit.

Besides, the first controller may send a control command for turning on/off each function part (e.g., Wi-Fi module, Bluetooth module, NFC module, GPS module, etc.) or a control command for adjusting a volume of the second mobile terminal using a figure object.

According to the present invention, it is able to use a figure object to instruct the second mobile terminal of a remotely controllable region.

Figure 25:
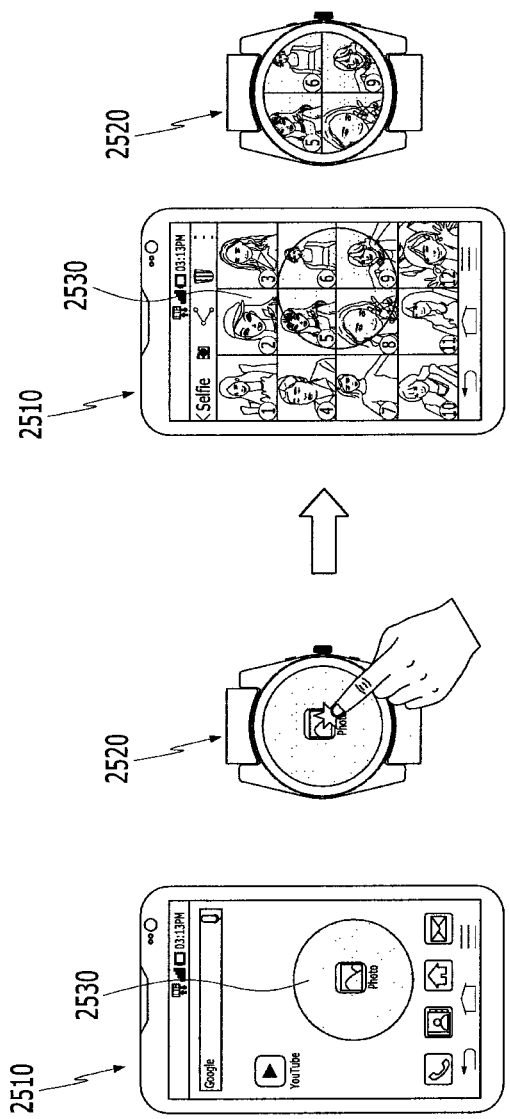
FIG. 25 is a diagram of one example for a first mobile terminal to be remotely controlled by a second mobile terminal.

For instance, FIG. 25 is a diagram of one example for a first mobile terminal to be remotely controlled by a second mobile terminal. For clarity of the following description, assume that the second mobile terminal 2520 currently mirrors a region indicated by a figure object 2530 of the first mobile terminal 2510.

Referring to FIG. 25, while the second mobile terminal 2520 outputs image data for a partial region of the first mobile terminal 2510, if a touch input of touching the second display unit is received, the second controller may send information on an object touched by the touch input or touched coordinates information to the first mobile terminal 2510.

The first controller can operate based on the information on the touched object or the touched coordinates information.

For instance, if a 'photo' icon currently outputted through the second display unit is touched [FIG. 25 (*a*)], the first controller can control an application mapped to the 'photo' icon to be outputted [FIG. 25 (*b*)].

As the photo application is run in the first mobile terminal, the second display unit may output at least one portion of a running screen of the photo application.

On the contrary, the second mobile terminal can send a shared data to the first mobile terminal. In doing so, a figure object can be used to determine a type of a shared data the second mobile terminal intends to send to the first mobile terminal.

For instance, FIGS. 26 to 28 are diagrams for examples of sending shared data to a first mobile terminal from a second mobile terminal. First of all, while a figure object is outputted, if a preset user input is received, the first controller can make a request for providing a list of shared data of a type indicated by the figure object to the second mobile terminal. In this case, the prescribed user input may include one of various touch input types such as an input of touching an inner region of a figure object over a prescribed time, an input of flicking to move a pointer currently touching an inner region of a figure object over a prescribed time in a prescribed direction, an input of flicking or dragging to move a prescribed number of pointers currently touching an inner region of a figure object in a prescribed direction, an input of tapping an inner region of a figure object with a pointer a prescribed number of times, and the like.

For instance, referring to FIG. 26 (a), if a figure object is currently displayed around a memo icon, the first controller can make a request for providing a memo list saved in the second mobile terminal to the second mobile terminal. Thereafter, referring to FIG. 26 (b), the first controller can output the memo list. If a user input for selecting at least one memo from the memo list is received, the first controller can make a request for providing the selected memo to the second mobile terminal.

The second controller can provide the first mobile terminal with the memo file requested by the first mobile terminal. If so, referring to FIG. 26 (c), the first controller can control the received memo to be outputted.

Referring to FIG. 27 (a), if a figure object 2730 is currently displayed around a photo icon, the first controller can make a request for providing a photo list saved in the second mobile terminal 2720 to the second mobile terminal 2720. If the photo list is received from the second mobile terminal 2720, referring to FIG. 27 (b), the first controller can output the photo list. If a user input for selecting at least one photo from the photo list is received, the first controller can make a request for providing the selected photo to the second mobile terminal 2720. If the photo is received from the second mobile terminal 2720, referring to FIG. 27 (c), the first controller can output the received photo.

Referring to FIG. 28 (a), if a figure object 2830 is currently displayed around a music icon, the first controller can make a request for providing a music list saved in the second mobile terminal 2820 to the second mobile terminal 2820. If the music list is received from the second mobile terminal 2820, referring to FIG. 28 (b), the first controller can output the music list. If a user input for selecting at least one music from the music list is received, the first controller can make a request for providing the selected music to the second mobile terminal 2820. If the music file is received from the second mobile terminal 2820, the first controller can output the received music file.

According to the examples shown in FIGS. 26 to 28, the first controller can receive a shared data from the second mobile terminal. In doing so, an attribute of the shared data received by the first mobile terminal from the second mobile terminal may be determined on the basis of an attribute of an icon indicated by a figure object. In addition to the attributes of memo, photo and music file shown in the drawing, it is able to share data of various attributes such as message, email, contact information, document, webpage and the like.

According to the examples shown in FIGS. 26 to 28, after the first mobile terminal has configured a file list of files saved in the second mobile terminal, if at least one file is selected from the file list, a request for sending the selected file can be made to the second mobile terminal.

Unlike the example mentioned in the above description, a request for sending a specific file can be directly made by the first controller to the second mobile terminal. In this case, the specific file sent to the first mobile terminal by the second mobile terminal may include one of a file last run in the second mobile terminal, a file last created from the second mobile terminal, a file most frequently run in the second mobile terminal, and the like.

For instance, if a request for sending a music file is made by the first mobile terminal, the second controller can provide the first mobile terminal with a last played file or a most frequently played file selected from the saved music files.

As mentioned in the foregoing description of the introduction with reference to FIG. 3, it is not mandatory for objects to include the figure objects shown in FIGS. 4 to 28. Moreover, an object may include a preset image such as an icon or the like. In this case, the embodiments described with reference to FIGS. 4 to 24 are applicable thereto as well. For instance, a size and location of a preset image can be adjusted by a user input. And, a data (e.g., a data corresponding to an icon displayed region, etc.) indicated by an image may be set as a shared data. Moreover, it is a matter of course that at least one menu for controlling the second mobile terminal remotely can be outputted on an icon.

For instance, FIG. 29 is a diagram for one example that an object is a preset image. Referring to FIG. 29 (a), the first controller can control an image 2930, which specifies a region to be shared with the second mobile terminal 2920, to be outputted.

In this case, referring to FIG. 29 (b), the first controller may set a region 2940, which is indicated by a circle having a prescribed radius R1 formed centering on an icon, as the region to be shared with the second display unit. In doing so, if a user's enlarging/reducing command is inputted, the radius R1 of the circle can be increased/decreased in response to the user input.

Unlike the example shown in FIG. 29, an outline of the preset image 2930 may be determined in accordance with a shape of the second display unit. For instance, if the second display unit has a circle shape, the outline of the preset image 2930 may have a circle shape. In this case, the first controller may set a region occupied by the preset image or a region, which is indicated by a circle having a prescribed radius formed centering on the region occupied by the preset image, as a region to share with the second display unit.

Like the example shown in FIG. 29, an object for specifying a shared data can be implemented by at least one of various kinds of visually recognizable means.

Accordingly, the present invention provides the following effect and/or feature.

In particular, the present invention provides a mobile terminal and controlling method thereof, by which a region desired to be shared with a watch type terminal can be guided advantageously.

And, the present invention provides a mobile terminal and controlling method thereof, by which a region desired to be shared with a watch type terminal can be guided in a manner of being matched to a display shape of the watch type terminal.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g. transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, embodiments of the present invention are directed to a mobile terminal and controlling method thereof that substantially obviate one or more problems due to limitations and disadvantages of the related art.

The present invention is devised for the aforementioned necessity, and an object of the present invention is to provide a mobile terminal and controlling method thereof, by which user's convenience is enhanced.

In particular, one object of the present invention is to provide a mobile terminal and controlling method thereof, by which a region desired to be shared with a watch type terminal can be guided.

Another object of the present invention is to provide a mobile terminal and controlling method thereof, by which a region desired to be shared with a watch type terminal can be guided in a manner of being matched to a display shape of the watch type terminal.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, as embodied and broadly described herein, a mobile terminal according to one embodiment of the present invention may include a touchscreen configured to output information, a wireless communication unit configured to communicate with a watch type terminal having a display, and a controller configured to control a display of an object on the touchscreen, in response to receiving a touch input at the touchscreen, transmitting, to the watch type terminal, control information outputted at the displayed object or a request for the watch type terminal to transmit data corresponding to the information.

In another aspect of the present invention, as embodied and broadly described herein, a method of controlling a mobile terminal according to another embodiment of the present invention may include establishing a wireless communication channel with a watch type terminal, displaying, on a touchscreen, an object indicating a region to share information with the watch type terminal, receiving, at the touchscreen, a touch input, and transmitting, to the watch type terminal, information outputted at the object or a request for transmitting a data of a type corresponding to the information.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen configured to output information;
   a wireless communication unit configured to communicate with a wearable device; and
   a controller configured to:
      control a display of an object on the touchscreen in response to receiving a first user input corresponding to touch drag input having a trace, wherein a shape of the displayed object is set based on a shape of a display of the wearable device,
      in response to receiving a second user input at the touchscreen, transmit, to the wearable device, an information corresponding to the displayed object,
      change a location of the displayed object in response to a drag input at the object, and
      in response to a portion of the object being at an edge of the touchscreen, the displaying of the object on the touchscreen is stopped and an indicator is displayed on the touchscreen rather than the object.

2. The mobile terminal of claim 1, wherein a size of the displayed object is based on a size formed by the trace of the first user input.

3. The mobile terminal of claim 1, wherein in response to receiving a touch input at the indicator, the controller is to resume displaying the object on the touchscreen.

4. The mobile terminal of claim 1, wherein the controller is configured to control an icon to be displayed on the indicator, the icon to correspond to an application currently executed in the wearable device or to correspond to an application most recently executed in the wearable device.

5. The mobile terminal of claim 1, wherein the controller is configured to transmit, to the wearable device, image data corresponding to an inside region of the displayed object.

6. The mobile terminal of claim 1, wherein the controller is configured to control displaying of a menu, on the touchscreen, for remotely controlling the wearable device, and
   in response to receiving a touch input at the menu, the controller is to control transmitting, to the wearable device, a remote control command corresponding to the touched input at the menu.

7. The mobile terminal of claim 6, wherein the menu is displayed along an outline of the displayed object or at an inside region of the displayed object.

8. The mobile terminal of claim 1, wherein the controller is configured to transmit, to the wearable device, an image data generated by capturing an inside of the displayed object.

9. The mobile terminal of claim 1, further comprising a camera configured to obtain a photo,
wherein the controller is configured to control a preview image to be displayed on the touchscreen based on information received by the camera, and
wherein when the object is displayed on the preview image, the controller is configured to control the camera to obtain a first photo of a full region of the preview image and a second photo of a partial region corresponding to an inside region of the displayed object.

10. The mobile terminal of claim 9, wherein when the first photo and the second photo are obtained, the controller is to control transmission, to the wearable device, of only the second photo and without the transmission of the first photo.

11. The mobile terminal of claim 1, wherein when the object is displayed at a map, the controller is to control transmission, to the wearable device, of address information of a place corresponding to an inside region of the displayed object.

12. The mobile terminal of claim 1, wherein when the object is displayed at a data file list, the controller is to control transmission, to the wearable device, of a data file corresponding to an inside region of the displayed object.

13. The mobile terminal of claim 1, wherein when the object is displayed at a data file list and a playable multimedia file corresponds to an inside region of the displayed object, the controller is to transmit, to the wearable device, a streaming data for a streaming playback of the multimedia file.

14. The mobile terminal of claim 1, wherein when the object is displayed at a data file list, the controller is to control transmission, to the wearable device, of a data file corresponding to an item dragged & dropped to an inside region of the displayed object.

15. The mobile terminal of claim 1, wherein the controller is configured to adjust a size or a location of the displayed object based on a remote control command received from the wearable device.

16. The mobile terminal of claim 1, wherein the controller is configured to make a request for transmitting, to the wearable device, a data file of an attribute indicated by the displayed object.

17. The mobile terminal of claim 1, wherein the first user input includes at least one of a drag input of drawing a prescribed trace, a touch input of tapping the touchscreen or a long touch input of touching the touchscreen over a prescribed time.

18. A method of controlling a mobile terminal, comprising:
establishing a wireless communication channel with a wearable device;
displaying, on a touchscreen, an object indicating a region to share information with the wearable device in response to receiving a first user input corresponding to touch drag input having a trace, wherein a shape of the displayed object is set based on the shape of the display of the wearable device;
receiving, at the touchscreen, a second user input;
transmitting, to the wearable device, an information corresponding to the displayed object,
changing a location of the displayed object in response to a drag input at the object; and
stopping the displaying of the object on the touchscreen in response to a portion of the object being at an edge of the touchscreen and displaying an indicator on the touchscreen rather than the object.

* * * * *